United States Patent
Itsumi et al.

(10) Patent No.: US 12,518,546 B2
(45) Date of Patent: Jan. 6, 2026

(54) INFORMATION PROCESSING APPARATUS, IMAGE TRANSMISSION SYSTEM, AND INFORMATION PROCESSING METHOD

(71) Applicant: NEC Corporation, Tokyo (JP)

(72) Inventors: Hayato Itsumi, Tokyo (JP); Yusuke Shinohara, Tokyo (JP); Koichi Nihei, Tokyo (JP); Takanori Iwai, Tokyo (JP); Florian Beye, Tokyo (JP); Charvi Vitthal, Tokyo (JP)

(73) Assignee: NEC CORPORATION, Tokyo (JP)

( * ) Notice: Subject to any disclaimer, the term of this patent is extended or adjusted under 35 U.S.C. 154(b) by 363 days.

(21) Appl. No.: 18/028,046

(22) PCT Filed: Oct. 2, 2020

(86) PCT No.: PCT/JP2020/037651
§ 371 (c)(1),
(2) Date: Mar. 23, 2023

(87) PCT Pub. No.: WO2022/070426
PCT Pub. Date: Apr. 7, 2022

(65) Prior Publication Data
US 2023/0343106 A1    Oct. 26, 2023

(51) Int. Cl.
*G06V 20/58* (2022.01)
*G06T 7/50* (2017.01)
(Continued)

(52) U.S. Cl.
CPC ............ *G06V 20/58* (2022.01); *G06T 7/50* (2017.01); *G06V 20/588* (2022.01); *H04N 7/183* (2013.01);
(Continued)

(58) Field of Classification Search
USPC .................................................. 382/103, 104
See application file for complete search history.

(56) References Cited

U.S. PATENT DOCUMENTS 9,506,763 B2 * 11/2016 Averbuch .............. B60W 50/14
10,318,782 B2 * 6/2019 Okumura ............... G06V 20/58
(Continued)

FOREIGN PATENT DOCUMENTS

JP    2010-044561 A    2/2010
JP    2011-121398 A    6/2011
(Continued)

OTHER PUBLICATIONS

JP Office Communication for JP Application No. 2022-553415, mailed on Nov. 28, 2023 with English Translation.
(Continued)

*Primary Examiner* — Ishrat I Sherali
(74) *Attorney, Agent, or Firm* — Sughrue Mion, PLLC

(57) ABSTRACT

The present disclosure provides an information processing apparatus and the like capable of specifying an object in an image that may affect traveling of a vehicle. An information processing apparatus includes: an acquisition unit that acquires an image captured by an image capturing unit mounted on a vehicle; an object detection unit that detects one or more objects in the acquired image; a traveling region specifying unit that specifies a traveling region, in which the vehicle is traveling, from regions in the acquired image; and a determination unit that determines, based on the traveling region, an image processing region, which is subjected to image processing, among regions of the one or more objects.

20 Claims, 22 Drawing Sheets

(51) Int. Cl.
  *G06V 20/56* (2022.01)
  *H04N 7/18* (2006.01)
(52) U.S. Cl.
  CPC ............... *G06T 2207/20021* (2013.01); *G06T 2207/30256* (2013.01); *G06T 2207/30261* (2013.01)

(56) References Cited

U.S. PATENT DOCUMENTS

| | | | | |
|---|---|---|---|---|
| 10,338,594 | B2* | 7/2019 | Long | G05D 1/0246 |
| 10,657,670 | B2* | 5/2020 | Gomezcaballero | H04N 13/204 |
| 11,132,561 | B2* | 9/2021 | Takahashi | G06V 40/103 |
| 11,704,910 | B2* | 7/2023 | Endo | G06V 20/58 362/466 |
| 12,106,576 | B2* | 10/2024 | Oh | G06V 20/58 |
| 12,106,584 | B2* | 10/2024 | Goto | G06V 20/58 |
| 12,322,190 | B2* | 6/2025 | Nakamura | G08G 1/167 |
| 2015/0363659 | A1* | 12/2015 | Mae | G06T 3/00 348/143 |
| 2019/0392226 | A1* | 12/2019 | Takahashi | G06V 20/58 |
| 2021/0279484 | A1* | 9/2021 | Mori | B60W 30/18163 |
| 2022/0148283 | A1* | 5/2022 | Aoki | G06V 10/25 |
| 2022/0262128 | A1* | 8/2022 | Nakamura | G08G 1/166 |
| 2024/0017748 | A1* | 1/2024 | Oi | G06V 20/58 |

FOREIGN PATENT DOCUMENTS

| | | |
|---|---|---|
| JP | 2018-041389 A | 3/2018 |
| JP | 2019-180075 A | 10/2019 |
| JP | 2020-004366 A | 1/2020 |
| JP | 2020-106921 A | 7/2020 |
| WO | 2019/077999 A1 | 4/2019 |
| WO | 2020/110857 A1 | 6/2020 |

OTHER PUBLICATIONS

International Search Report for PCT Application No. PCT/JP2020/037651, mailed on Dec. 28, 2020.

JP Office Action for JP Application No. 2022-553415, mailed on Mar. 19, 2024 with English Translation.

* cited by examiner

|  | LEFT ADJACENT LANE | TRAVELING LANE | RIGHT ADJACENT LANE | OTHERS |
|---|---|---|---|---|
| PERSON | 100 | 100 | 100 | 40 |
| BICYCLE | 60 | 80 | 40 | 30 |
| VEHICLE | 60 | 80 | 40 | 20 |

Fig. 11

| OBJECT ID | TIME | DISTANCE |
|---|---|---|
| 1001 | 10:01:01 | 20.0m |
| 1001 | 10:01:02 | 18.5m |
| 1001 | 10:01:03 | 17.1m |
| 1002 | 10:01:01 | 19.1m |
| 1002 | 10:01:02 | 19.2m |
| 1002 | 10:01:03 | 20.1m |
| ... | ... | ... |

Fig. 14

INFORMATION PROCESSING APPARATUS, IMAGE TRANSMISSION SYSTEM, AND INFORMATION PROCESSING METHOD

This application is a National Stage Entry of PCT/JP2020/037651 filed on Oct. 2, 2020, the contents of all of which are incorporated herein by reference, in their entirety.

TECHNICAL FIELD

The present disclosure relates to an information processing apparatus, an image transmission system, and an information processing method.

BACKGROUND ART

In remote monitoring and control of vehicles via a mobile phone network, since an available bandwidth fluctuates, there is concern that an image quality will deteriorate due to the lack of bandwidth. Therefore, a method is expected for providing necessary information by transmitting only camera images and regions, which are important for driving, with high image quality.

For example, Patent Literature 1 discloses a vehicle traveling recording apparatus that specifies, from the image data, a first predetermined range based on a line-of-sight direction of a driver of the vehicle, as a peripheral situation monitoring image data. In addition, Patent Literature 2 discloses an image capturing apparatus including: in order to reduce the amount of image transmission, an image capturing unit that captures an image to be captured; and a transmission control unit that performs transmission control to transmit a region image within a plurality of transfer regions, which corresponds to an entire or partial region of the captured image, at a frame rate set for each of the transfer regions.

CITATION LIST

Patent Literature

Japanese Unexamined Patent Application Publication No. 2020-106921
International Publication No. WO 2019/077999

SUMMARY OF INVENTION

Technical Problem

However, as in Patent Literature 1, even when the first predetermined range based on the line-of-sight direction of the driver of the vehicle is used, there is a case where the region important for traveling of the vehicle cannot be specified with sufficient accuracy. Further, even in Patent Literature 2, when the number of detected objects in the image increases, there is a case where the region important for traveling of the vehicle cannot be specified.

The present invention has been made in order to solve these problems, and an object thereof is to provide an information processing apparatus and the like capable of specifying an object in an image that may affect traveling of a vehicle.

Solution to Problem

A first aspect of the present disclosure provides an information processing apparatus including:

an acquisition unit that acquires an image captured by an image capturing unit mounted on a vehicle;
an object detection unit that detects one or more objects in the acquired image;
a traveling region specifying unit that specifies a traveling region, in which the vehicle is traveling, from regions in the acquired image; and
a determination unit that determines, based on the traveling region, an image processing region, which is subjected to image processing, among regions of the one or more objects.

A second aspect of the present disclosure provides image transmission system including:

an acquisition unit that acquires an image captured by an image capturing unit;
an object detection unit that detects one or more objects in the acquired image;
a traveling region specifying unit that specifies a traveling region, in which the vehicle is traveling, from regions in the acquired image; and
a determination unit that determines, based on the traveling region, an image processing region, which is subjected to image processing, among regions of the one or more objects.

A third aspect of the present disclosure provides an information processing method including:

acquiring an image captured by an image capturing unit mounted on a vehicle;
detecting one or more objects in the acquired image;
specifying a traveling region, in which the vehicle is traveling, from regions in the acquired image; and
determining, based on the traveling region, an image processing region, which is subjected to image processing, among regions of the one or more objects.

Advantageous Effects of Invention

According to the present disclosure, it is possible to provide an information processing apparatus and the like capable of specifying an object in an image that may affect traveling of a vehicle.

BRIEF DESCRIPTION OF DRAWINGS

FIG. 11 is a table showing an example of priorities associated with lane regions, other regions on a road, and types of detected objects;

FIG. 14 is a table showing an example in which vehicles, objects, and distances are managed.

EXAMPLE EMBODIMENT

Specific example embodiments of the present invention will be described below with reference to the drawings. However, the present invention is not limited to example embodiments to be described below. Further, the following description and drawings are simplified as appropriate for the sake of clarity of description.

First Example Embodiment

Figure 1:
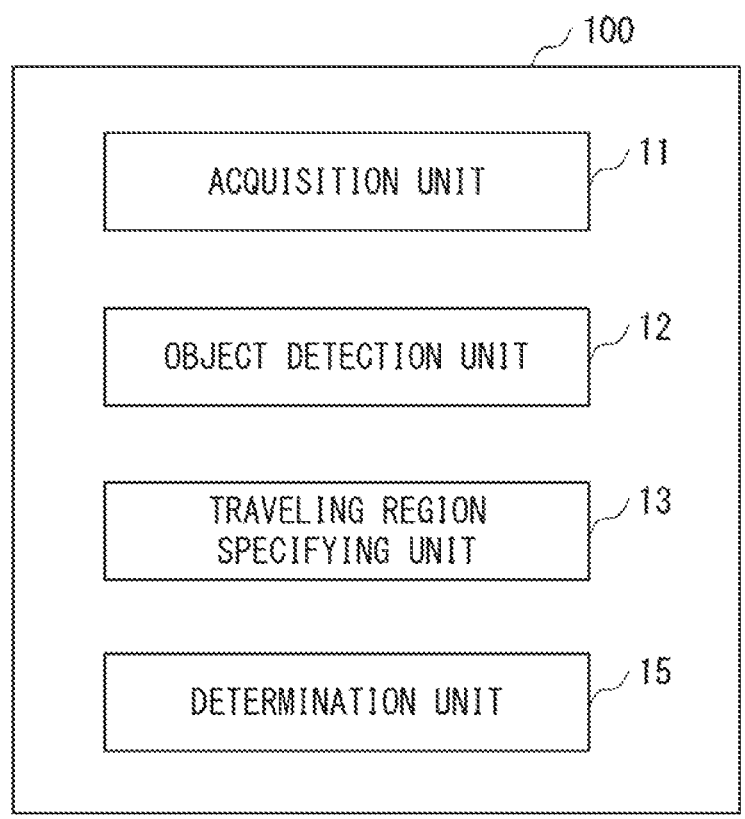
FIG. 1 is a block diagram showing a configuration of an information processing apparatus according to a first example embodiment.

FIG. 1 is a block diagram showing a configuration of an information processing apparatus according to a first example embodiment.

An information processing apparatus 100 is configured by a computer including a processor and a memory. The information processing apparatus 100 is used to specify a region in an image that is important for traveling of a vehicle and to perform different image processing on the specified region and other regions. The information processing apparatus 100 includes an acquisition unit 11 that acquires an image captured by an image capturing unit mounted on a vehicle, an object detection unit 12 that detects one or more objects in the acquired image, a traveling region specifying unit 13 that specifies a traveling region, in which the vehicle is traveling, from the region in the acquired image, and a determination unit 15 that determines, based on the traveling region, an image processing region, which is subjected to image processing, from regions of the one or more objects.

The acquisition unit 11 is connected to an image capturing unit (for example, an in-vehicle camera) via a network. The image capturing unit is, for example, a camera such as a digital still camera or a digital video camera which includes an image capturing element such as a CCD or CMOS sensor, and is configured to capture an image and output the image as an electrical signal.

The object detection unit 12 detects one or more objects in the image by presetting objects that can affect driving of the vehicle, for example. The objects may be moving objects or stationary objects.

The traveling region specifying unit 13 specifies, as a region in the image a traveling region in which the vehicle is traveling. The traveling region specifying unit 13 may specify a traveling region by detecting lane separation indicators such as traveling lanes or guide poles.

Alternatively, the traveling region specifying unit 13 may specify a virtual traveling region in consideration of a vehicle width, steering (moving direction), and a vehicle speed. The virtual traveling region may be specified by assuming that the vehicle is traveling even when the vehicle is stopped. For example, it is possible to specify a traveling region by adding a predetermined margin to the vehicle width and drawing two virtual lines on a road in the image along an advancing direction of the vehicle.

The determination unit 15 determines, based on the specified traveling region, an image processing region, which is subjected to image processing, from regions of the one or more detected objects.

Figure 2:
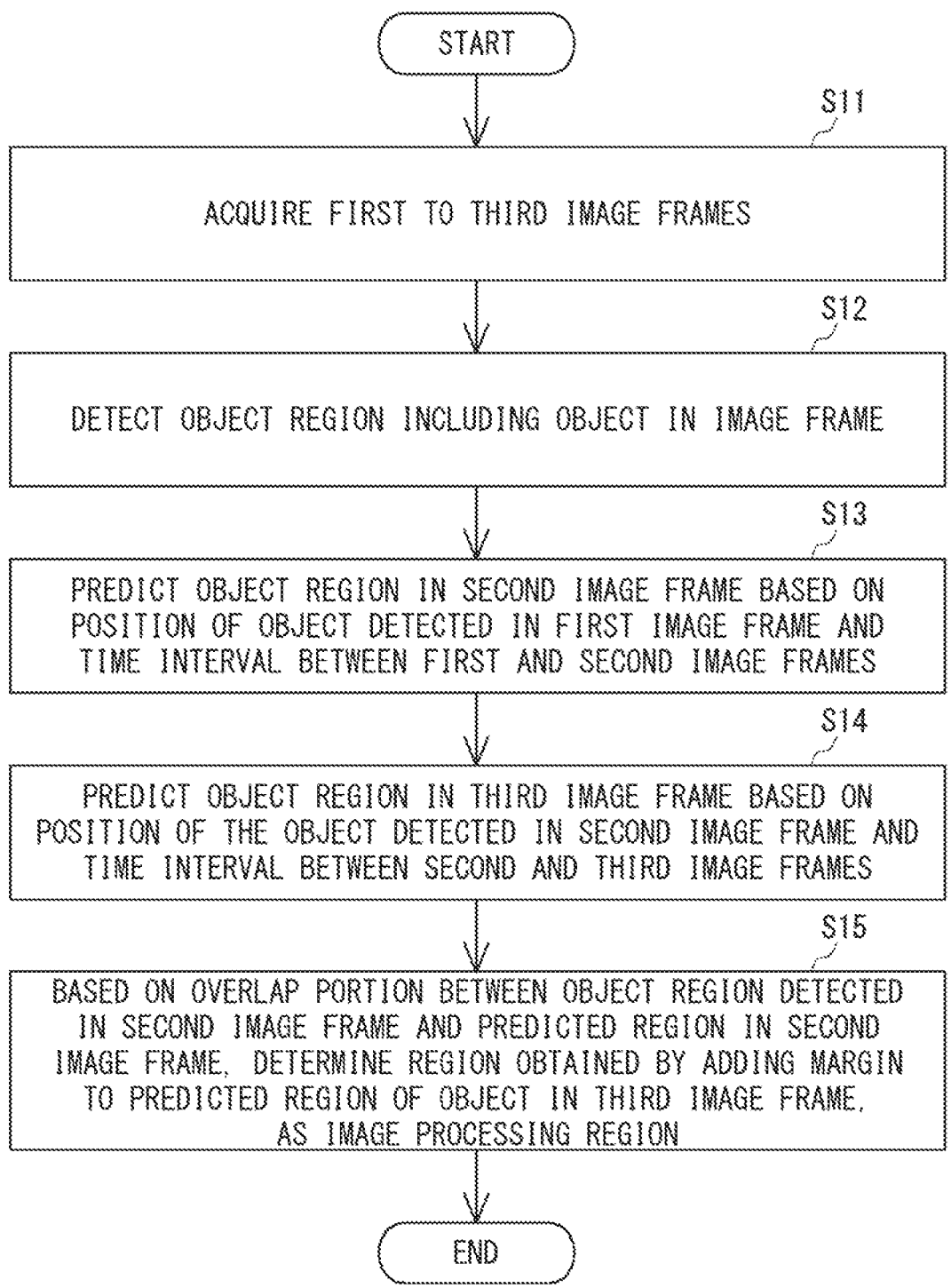
FIG. 2 is a flowchart showing an information processing method according to the first example embodiment.

FIG. 2 is a flowchart showing an information processing method according to the first example embodiment.

An image captured by the image capturing unit mounted on the vehicle is acquired (step S11). One or more objects in the acquired image are detected (step S12). A traveling region in which the vehicle is traveling is specified in a region in the acquired image (step S13). Based on the traveling region, an image processing region subjected to image processing is determined from regions of the one or more objects (step S15).

According to the information processing apparatus according to the first example embodiment described above, it is possible to specify an object in the image that may affect the traveling of the vehicle.

Second Example Embodiment

Figure 3:
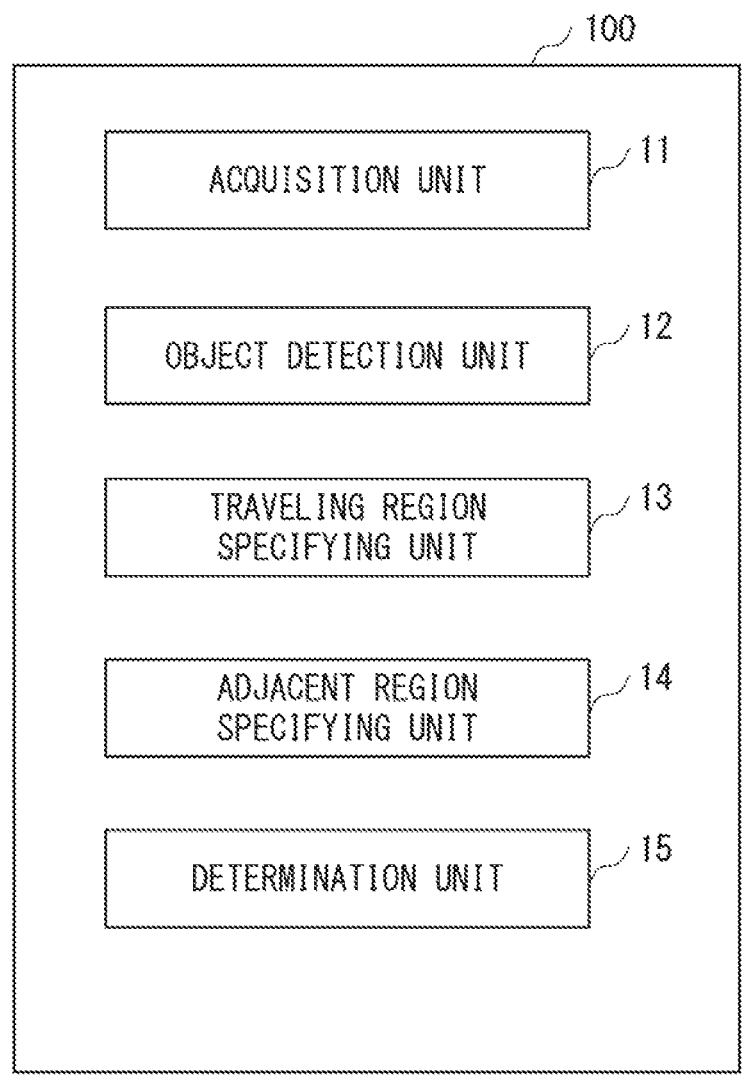
FIG. 3 is a block diagram showing a configuration of an information processing apparatus according to a second example embodiment.

FIG. 3 is a block diagram showing a configuration of an information processing apparatus according to a second example embodiment.

An information processing apparatus 100 includes an acquisition unit 11 that acquires an image captured by an image capturing unit mounted on a vehicle, an object detection unit 12 that detects one or more objects in the acquired image, a traveling region specifying unit 13 that specifies a traveling region, in which the vehicle is traveling, from the region in the acquired image, an adjacent region specifying unit 14 that specifies, as an region adjacent to the traveling region, an adjacent region including one or more objects that may affect the traveling of the vehicle, and a determination unit 15 that determines, based on the traveling region and the adjacent region, an image processing region, which is subjected to image processing, from regions of the one or more objects.

The adjacent region specifying unit 14 may specify an adjacent region by detecting adjacent lanes, roadside strips, or sidewalks adjacent to the specified traveling region. Alternatively, the adjacent region specifying unit 14 may decide an adjacent region by setting a predetermined adjacent region (for example, a region corresponding to a road width of 3.0 to 3.5 m) adjacent to the specified traveling region. Further, a margin of a predetermined ratio with respect to the width of the traveling lane may be decided as an adjacent region. The adjacent region may be set only on one side of the traveling region, or may be set on both sides of the traveling region. When the adjacent regions are set on both sides of the traveling region, a width of one adjacent region may differ from a width of the other adjacent region.

The determination unit 15 can determine, for example, one or more object regions that overlap with a region including the traveling region and the adjacent region, as an image processing region subjected to image processing. The determination unit 15 can determine such overlapping object regions as a region to be subjected to high image quality processing compared with other regions in the image.

Figure 4:
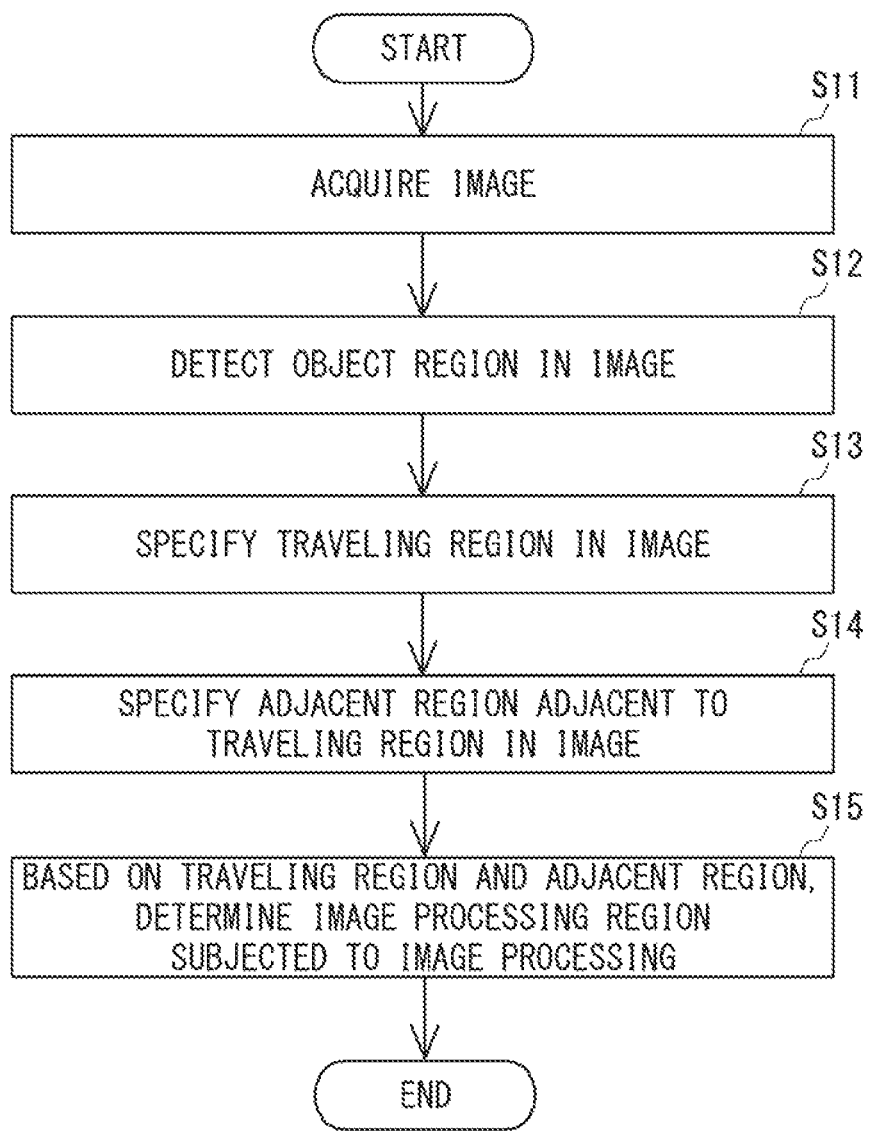
FIG. 4 is a flowchart showing an information processing method according to the second example embodiment.

FIG. 4 is a flowchart showing an information processing method according to the second example embodiment.

An image captured by the image capturing unit mounted on the vehicle is acquired (step S11). One or more objects in the acquired image are detected (step S12). A traveling region in which the vehicle is traveling is specified in a region in the acquired image (step S13). An adjacent region including one or more objects that may affect the traveling of the vehicle is specified as a region adjacent to the traveling region (step S14). Based on the traveling region and the adjacent region, an image processing region subjected to image processing is determined from regions of the one or more objects (step S15).

According to the information processing apparatus according to the second example embodiment described above, it is possible to specify an object in the image that may affect the traveling of the vehicle and to determine a region to be subjected to predetermined image processing.

Third Example Embodiment

Figure 5:
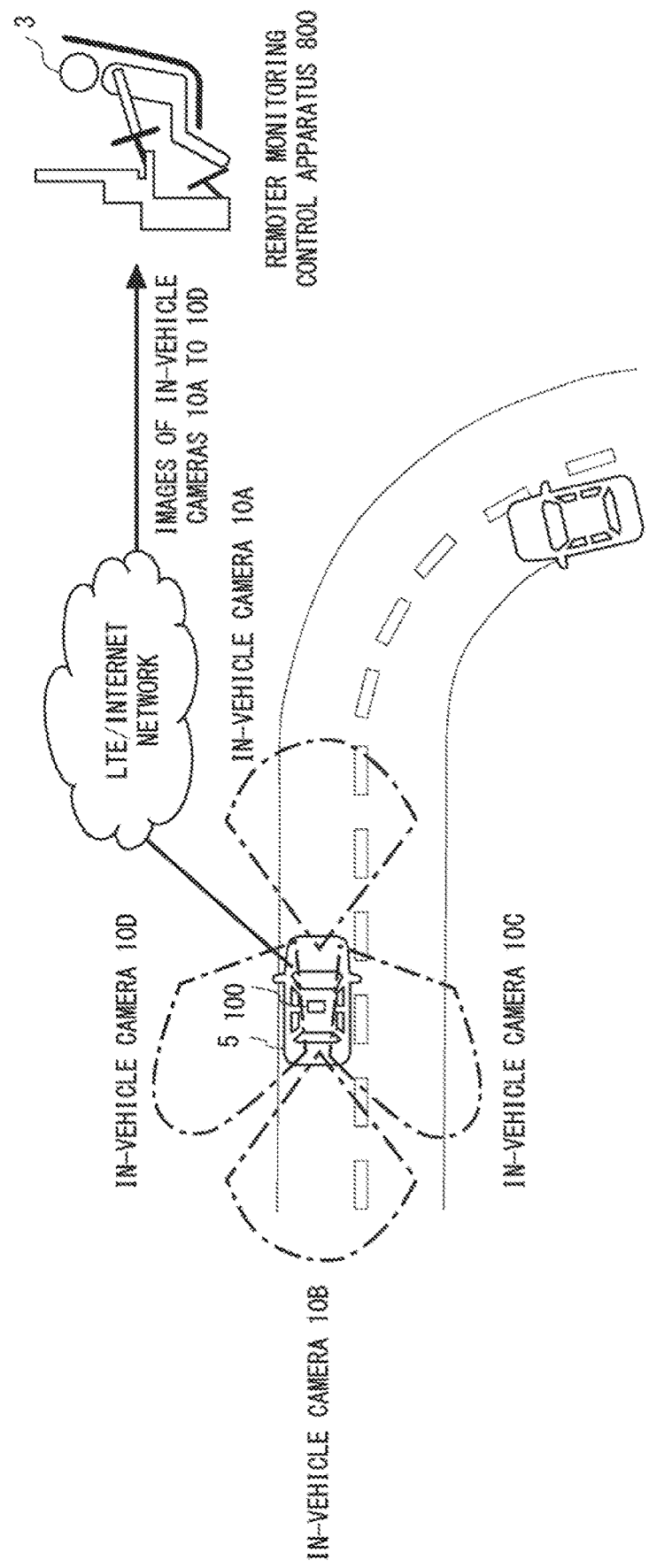
FIG. 5 is a schematic diagram for describing an outline of a remote monitoring operation system.

FIG. 5 is a schematic diagram for describing an outline of a remote monitoring operation system.

The remote monitoring operation system remotely operates a vehicle 5, which does not require a driver, from a remote monitoring center. As a method for remotely operating the unmanned operation vehicle 5, images captured by a plurality of in-vehicle cameras 10A to 10D mounted on the vehicle 5 are transmitted to a remote monitoring control apparatus 800 via a wireless communication network and the Internet. The information processing apparatus 100 mounted on the vehicle is used to perform predetermined image processing on the images captured by the in-vehicle cameras and transmit the images subjected to the image processing to the remote monitoring control apparatus 800 via the network. The remote monitoring control apparatus 800 displays the received images on a display unit such as a monitor, and a remote driver 3 remotely operates the vehicle 5 while viewing the received images on the monitor. The remote monitoring control apparatus 800 may display not only the received images but also information for remote operation of the vehicle 5 by the remote driver 3. For example, the remote monitoring control apparatus 800 may display the received images and analysis results to the remote driver 3. A remote operation control apparatus mounted on the vehicle 5 performs two-way communication with the remote ground monitoring control apparatus 800 using a communication system (for example, LTE, 5G) using a mobile phone network. The remote monitoring operation system may switch to remote control or automatic control when the vehicle under remote monitoring senses danger for the vehicle while the vehicle is traveling. In other words, the vehicle being driven by a person may be temporarily switched to such control, and the vehicle may have a driver.

The in-vehicle camera 10A captures a front of the vehicle, the in-vehicle camera 10B captures a rear of the vehicle, the in-vehicle camera 10C captures a right side of the vehicle, and the in-vehicle camera 10D captures a left side of the vehicle. In addition, the number of in-vehicle cameras is not limited thereto, and may be five or more. Although the performances of the cameras are basically equal to each the same, but may be slightly different from each other. Ordinary drivers of taxis or the like are required to have a second-class license, which requires the ability to recognize a target object (also called an object) within a range that a person with eyesight of 0.8 or higher can see. Therefore, the image provided to the remote driver may also be an image that allows the driver to recognize a target object within the range that a person with eyesight of 0.8 or higher can see (for example, in a case of road markings on a general road, the driver can see the markings from a distance of 10.66 m). The remote driver needs to visually recognize not only the target object but also surrounding information of the target object, and such surrounding information can also be transmitted to the remote driver as a relatively high-quality image.

Under the remote monitoring and control of the vehicle via the mobile phone network, since an available bandwidth fluctuates, there is concern that the image quality will deteriorate due to the lack of bandwidth. For this reason, when the bandwidth drops, only the important region of the captured image is sent in high quality, and the other regions are sent in low quality to the remote monitoring center, thereby maintaining the accuracy of image analysis at the remote monitoring center. In this way, it is possible to maintain QoE (Quality of Experience) when the bandwidth drops.

Figure 6:
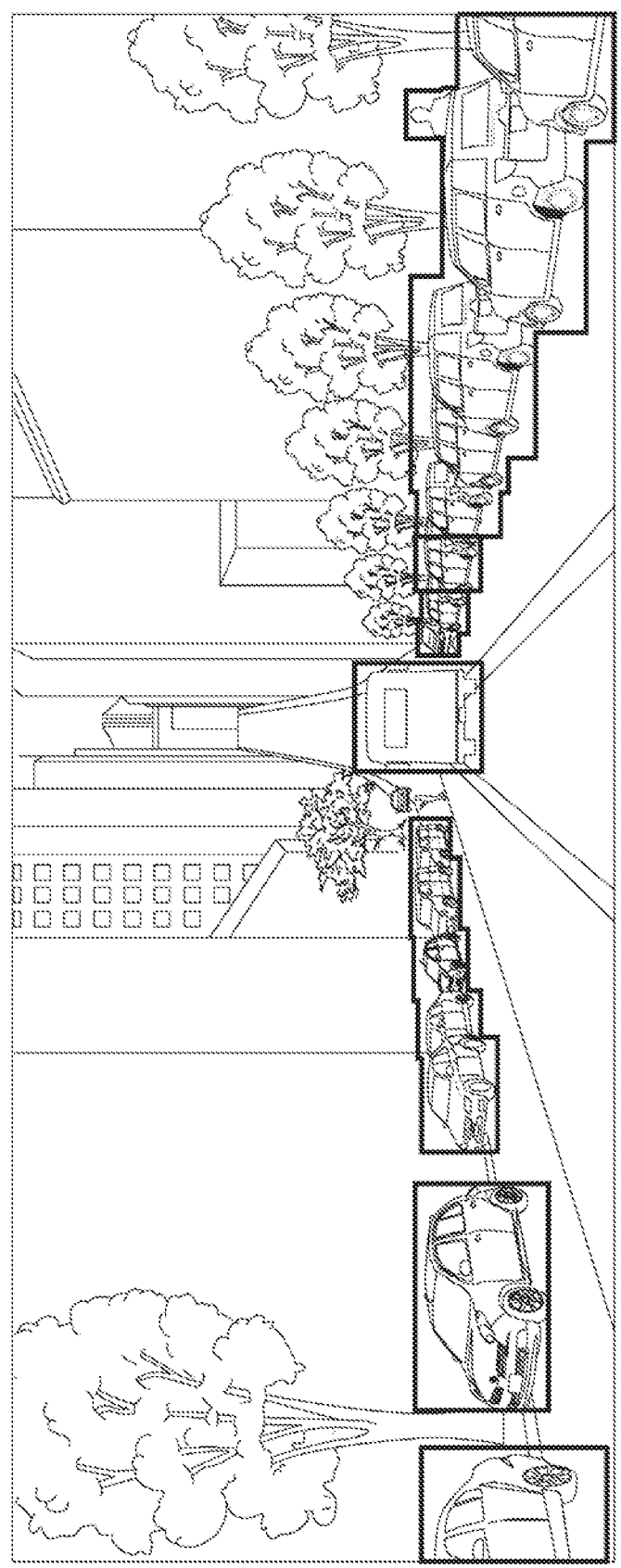
FIG. 6 is a screen showing an example of an image captured by an in-vehicle camera of a vehicle.

FIG. 6 is a screen showing an example of an image captured by the in-vehicle camera of the vehicle.

FIG. 6 shows an example of an image of the front of the vehicle captured by the in-vehicle camera 10A shown in FIG. 5. A detected object is surrounded by a bounding box (this region being also called ROI (Region of Interest)). Here, as ROIs, other vehicles, pedestrians, bicycles, traffic lights, and traffic signs that can affect the driving of the vehicle are detected. For example, a large number of vehicles parked on both roadside strips of the road are detected in FIG. 6. As described above, when the number of objects detected in the captured image increases, the region to be improved in image quality becomes larger, whereby the available bandwidth increases as a result. Therefore, it becomes difficult to determine which ROI should be improved in image quality. Further, as described above, since the available bandwidth may fluctuate, the image sent to the remote monitoring center may be coarse when the bandwidth is low, which may cause troubles in monitoring of the remote driver.

Figure 7:
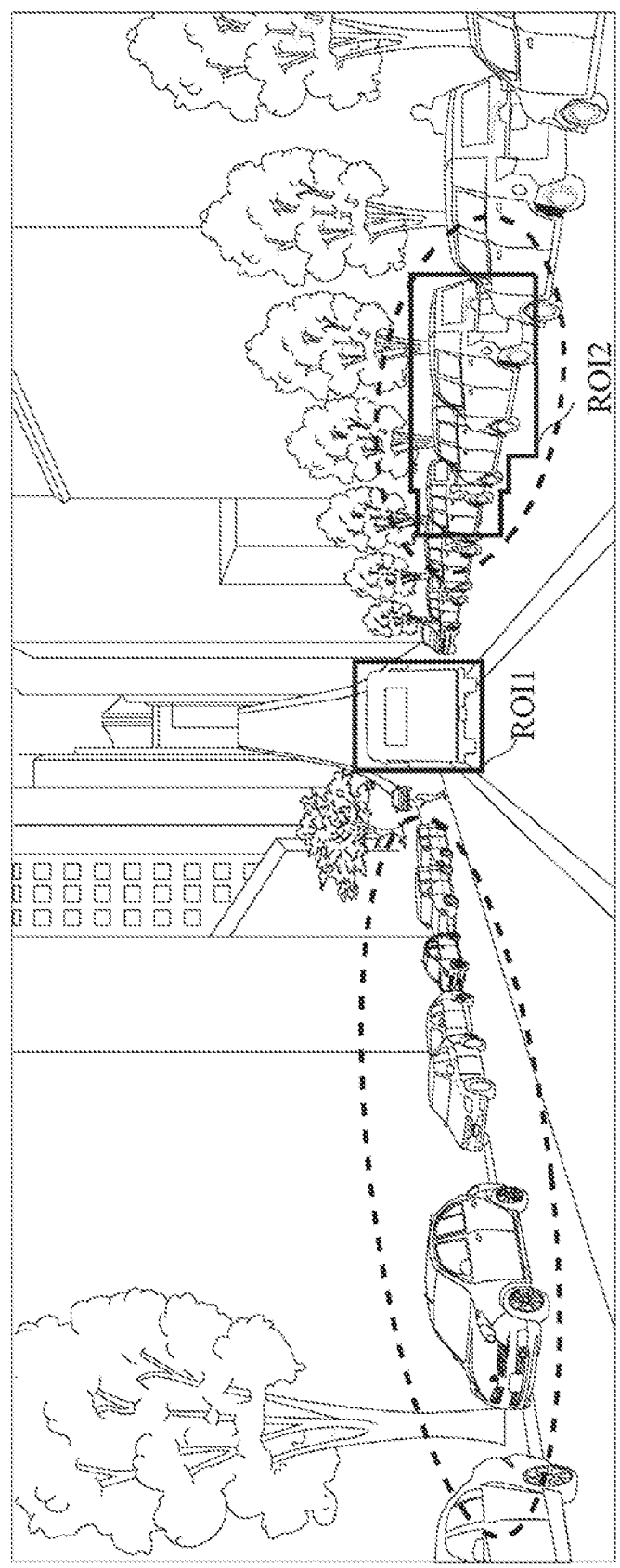
FIG. 7 is a screen showing a selection example of ROIs subjected to high image quality processing.

Therefore, the present disclosure has an object to select an object that affects the driving and improve the image quality of the region, thereby suppressing the available bandwidth and maintaining QoE for monitoring even when the bandwidth is low. FIG. 7 shows a selection example of ROIs subjected to high image quality processing. For example, it is considered that an ROI1 of a preceding vehicle is a region where an image quality should be improved in a traveling lane. It is not considered that on-road parking on lanes opposite to the traveling lane in which the vehicle is traveling does not affect the driving of the vehicle. In addition, as for on-road parking on a roadside strip on the same lane as the traveling lane, only an ROI2 is considered to be a region where vehicles may start and where an image quality should be improved. Furthermore, since a sidewalk is sufficiently separated from the traveling lane by an adjacent lane and a roadside strip, it is considered that pedestrians on the sidewalk are does not affect the traveling of the vehicle. A set of preset rules for classifying whether or not it affects the driving of the vehicle is called a rule base.

Figure 8:
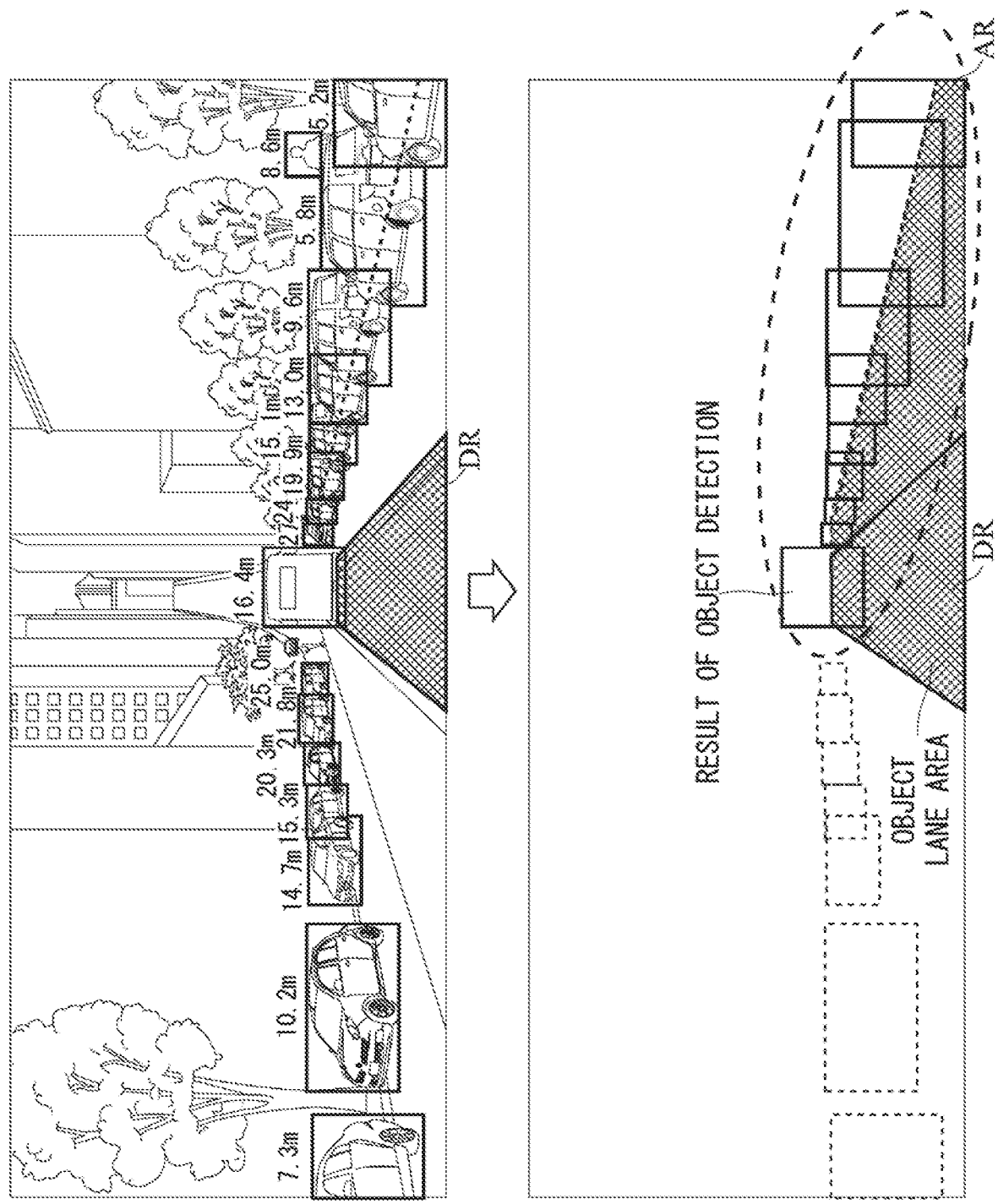
FIG. 8 is a screen for describing an example of a rule base technique according to a third example embodiment.

FIG. 8 is a screen for describing an example of a rule base technique according to a third example embodiment of the present disclosure.

First, a plurality of lanes are detected from images captured by an in-vehicle camera. The lanes can be detected using an existing method (for example, see "Ultra Fast Structure-aware Deep Lane Detection by Zequn Qin, Non-Patent Literature). In FIG. 8, a region DR surrounded by two lanes at a bottom center of the screen is regarded as a traveling lane in a front image captured by the in-vehicle camera. Further, a region between the traveling lane and a lane adjacent to the traveling lane is regarded as an adjacent lane AR (also referred to as a first left adjacent lane or a first right adjacent lane, or simply referred to as a left adjacent lane or a right adjacent lane). Further, a region between the first left adjacent lane and a lane adjacent to the first left adjacent lane is regarded as a second left adjacent lane. Similarly, a region between the first right adjacent lane and a lane adjacent to the first right adjacent lane is regarded as a second right adjacent lane.

In the example of FIG. 8, the traveling lane is detected in which the vehicle is traveling, and the right adjacent lane (including a roadside strip) adjacent to the traveling lane is detected as an adjacent lane. On the other hand, one or more objects are also detected which can affect the traveling of the vehicle. One or more objects overlapping the detected lane region can be determined as regions subjected to high image quality processing. The objects do not have to completely overlap the lane region, and may partially overlap.

In addition, when many objects are detected, a region subjected to high image quality processing can be selected from many objects, based on a priority given to the traveling lane, a priority given to the adjacent lane, and a priority given to the other regions. For example, the upper limit number of ROIs (for example, 8) may be set, and a region subjected to high image quality processing may be selected from many objects according to the priority. In addition, an upper limit area (for example, within 30% of the entire image frame) of the entire image frame may be set, and a region subjected to high image quality processing may be selected from many ROIs according to the priority. A region subjected to high image quality processing may be set so as to be within 30% of the entire image frame in order of smaller area and higher priority (that is, priority/ROI area). Note that the ROIs subjected to high image quality processing can be changed in the upper limit number and the upper limit area according to the available bandwidth. For example, when the available bandwidth increases, the upper limit number can be increased or the upper limit area can be expanded.

Figure 9:
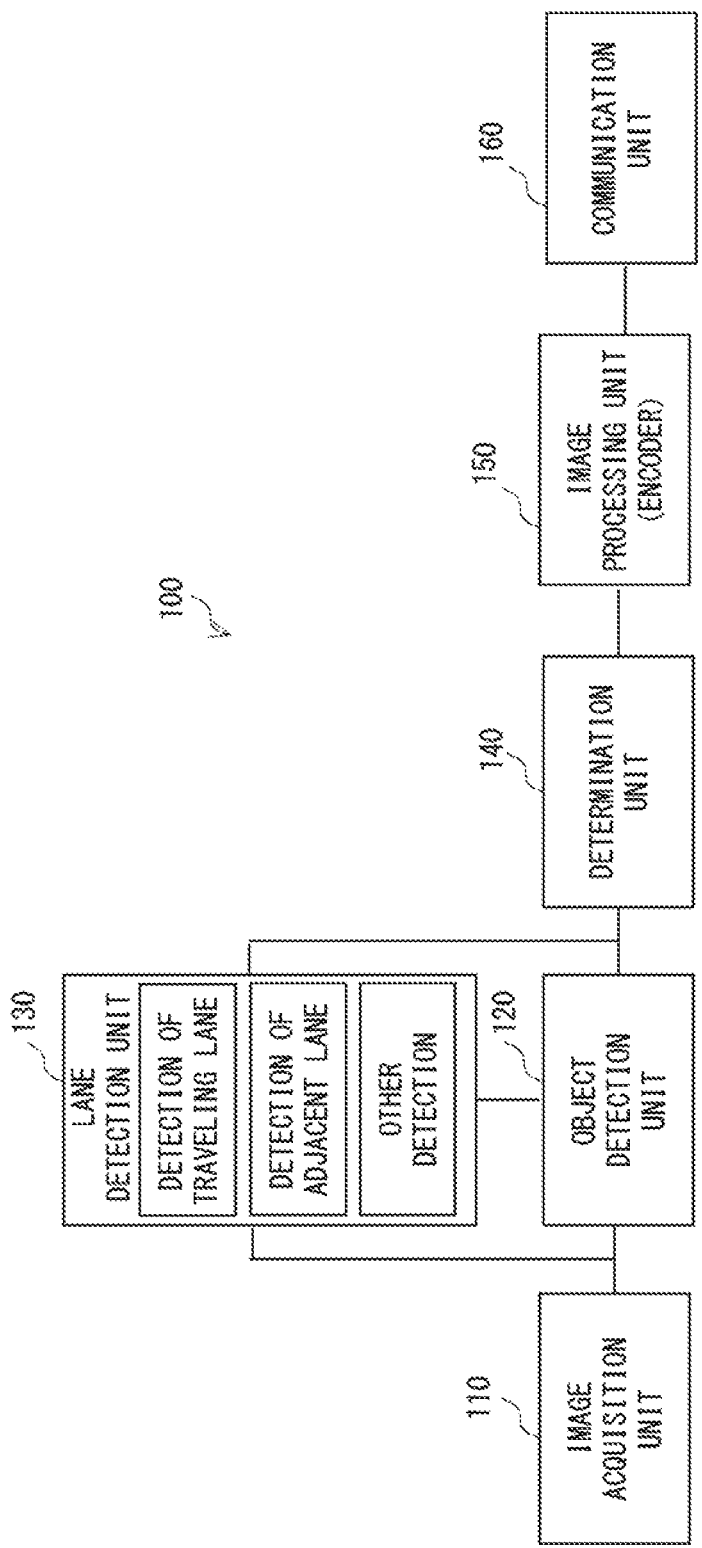
FIG. 9 is a block diagram showing a configuration of an information processing apparatus according to a third example embodiment.

FIG. 9 is a block diagram showing a configuration of the information processing apparatus.

The information processing apparatus 100 is configured by a computer including a processor and a storage unit. The information processing apparatus 100 is mounted on the vehicle and can be used to detect one or more objects, determine an object that affects driving of the vehicle from the one or more objects, improve an image quality of only the determined object region compared to other regions, and transmit it to the remote monitoring center. The information processing apparatus 100 includes an image acquisition unit 110, an object detection unit 120, a lane detection unit 130, a determination unit 140, an image processing unit (encoder) 150, and a communication unit 160. The information processing apparatus 100 according to the present example embodiment is also referred to as an image processing apparatus.

The image acquisition unit 110 sequentially acquires images, which is captured by the in-vehicle camera 10A (FIG. 3), as image frames at a predetermined frame rate. In this example, image frames captured by the in-vehicle camera 10A will be described as an example, but the present disclosure is not limited thereto. For example, the information processing apparatus according to the present disclosure can also be applied to image frames captured by the in-vehicle camera 10B that captures the rear of the vehicle.

The object detection unit 120 detects an object in the image acquired by the image acquisition unit 110. The object to be detected can be arbitrarily set in advance. Here, objects (for example, persons, vehicles, motorcycles, bicycles, trucks, buses, or the like) are set that may affect the driving of the vehicle. The object detection unit 120 can also identify the type of objects (for example, persons, vehicles, bicycles, or motorcycles) using a known image recognition technique.

The lane detection unit 130 detects lanes or the like in the frames acquired by the image acquisition unit 110. Specifically, the lane detection unit 130 detects a traveling lane in which the vehicle is traveling, adjacent lanes (a right adjacent lane and a left adjacent lane) adjacent to the traveling lane, and regions and objects on other peripheral roads. Examples of other regions on the road include roadside strips, sidewalks, bicycle paths, and median strips. Examples of other objects on the road include walls, fences, and guardrails.

Figure 10:
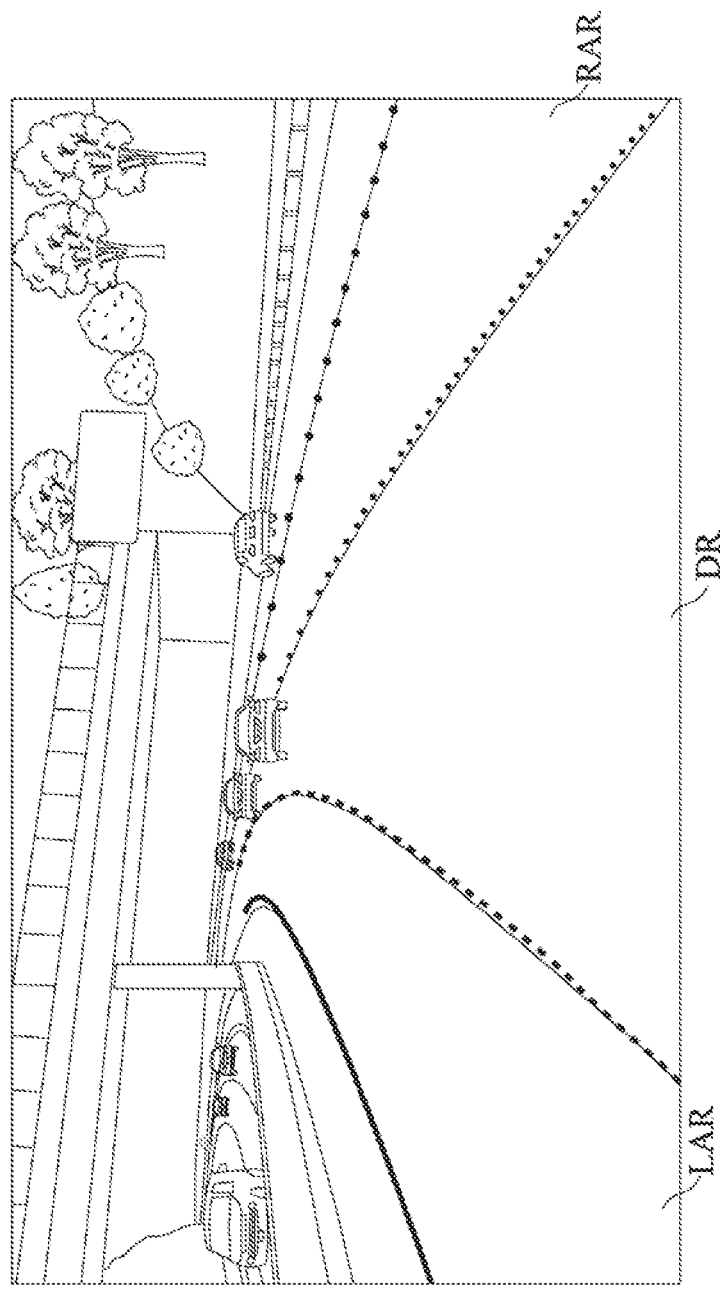
FIG. 10 is a screen for describing an example of lane detection on a highway with four-lanes per one direction.

FIG. 10 is a screen for describing an example of lane detection on a highway with four-lanes per one direction.

Vehicles are traveling in a second lane from the left. The lane detection unit 130 detects lanes in the image, and recognizes a region sandwiched by two lanes as a traveling lane DR. Further, the lane detection unit 130 recognizes regions sandwiched by lanes adjacent to the traveling lane as a left adjacent lane (a left adjacent region LAR) and a right adjacent lane (a right adjacent region RAR).

For example, when a fence or a median strip is detected in the center of the road, since an oncoming vehicle hardly affects the vehicle, the lane detection unit 130 may exclude a lane adjacent to a lane for the oncoming vehicle from the lane region, as shown in FIG. 10. In the example of FIG. 10, one or more target objects overlapping the traveling lane, the left adjacent lane, and the right adjacent lane can be regarded as regions that should have higher image quality than other regions.

On the other hand, for example, when no fence or median strip is detected in the center of the road, the lane detection unit 130 may determine that an oncoming vehicle may affect the vehicle. For example, when the vehicle is traveling in a first lane from the left adjacent to the lane for the oncoming vehicle, the lane region may also include the lane adjacent to the lane for the oncoming vehicle.

When the traveling lane of the vehicle is adjacent to the sidewalk, since there is a risk that a person may jump out of the sidewalk into the traveling lane, the lane detection unit 130 may detect the sidewalk as the adjacent region.

The determination unit 140 determines a region subjected to higher image quality processing compared to other regions, based on the detected lane region including the traveling lane and the adjacent lanes, the other regions on the road, and one or more detected objects. In other words, the determination unit 140 determines to divide the image including one or more objects into a region in the image subjected to high image quality processing and a region subjected to low image quality processing. The determination unit 140 can also determine one or more detected regions, which overlap the lane region and other regions on the road, as regions subjected to high image quality processing.

The high image quality processing may include, for example, contrast increase processing, high resolution processing, tone number increase processing, color number increase processing, dynamic range increase processing, or compression rate reduction processing. The low image quality processing may include, for example, contrast reduction processing, low resolution processing, tone number reduction processing, or dynamic range reduction processing. The high image quality processing may also include contrast reduction processing, low resolution processing, tone number reduction processing, color number reduction processing, or dynamic range reduction processing, but is various image processing that achieve a higher image quality than the low image quality processing. Although it has been described that the determination unit 140 divides the region subjected to high image quality processing and the region subjected to low image quality processing, it is sufficient as long as the region subjected to high image quality processing has a higher image quality than the region subjected to low image quality processing, and the low image quality processing may not necessarily be performed.

When a large number of objects are detected, the determination unit 140 can also determine a region subjected to high resolution processing, based on priorities associated with the lane region, other regions on the road, and types of the detected objects. At this time, a greedy algorithm may be used. Details will be described below with reference to FIG. 11.

The image processing unit (encoder) 150 encodes the region determined by the determination unit 140 so as to have a higher image quality than other regions in the frame. For example, the image processing unit (encoder) 150 can encode the region subjected to high image quality processing at a first compression rate, and can encode the region subjected to low image quality processing at a second compression rate higher than the first compression rate. Further, in the region subjected to low image quality processing, colors may be reduced, and for example, an RGB color image may be converted into a grayscale image. The image processing unit (encoder) 150 can perform various image processing (also called an image processing unit).

The communication unit 160 is a communication interface with a network. The communication unit 160 is used to communicate with another network node apparatus (for example, an information processing apparatus closer to the remote monitoring center) constituting an information processing system. The communication unit 160 may be used to perform wireless communication. For example, the communication unit 160 may be used for wireless LAN communication defined in IEEE 802.11 series or mobile communication defined in 3 GPP (3rd Generation Partnership Project), 4G, 5G, or the like. Further, the communication unit 160 can also be communicably connected to a smartphone via Bluetooth (registered trademark). The communication unit 160 can be connected to the camera via a network.

The communication unit 160 transmits the encoded image frame data to the remote monitoring center. The communication unit 160 transmits the encoded image data to the remote monitoring control apparatus 800 (FIG. 5) via a mobile network such as LTE or 5G.

FIG. 11 is a table showing an example of priorities associated with the lane region, other regions on the road, and types of the detected objects. In this example, a case will be described in which the vehicle is traveling in a center lane on a road with three lanes per one direction. In this example, the center lane is regarded as a traveling lane, and a left adjacent lane and a right adjacent lane, which are adjacent to the center lane, are regarded as adjacent regions. Further, a sidewalk adjacent to the right adjacent lane is also regarded as an adjacent region.

It is assumed that the higher the numerical value shown in the table, the higher the priority. For example, when it is detected that a person is in the left adjacent lane, the traveling lane, and the right adjacent lane (that is, when it is detected that a person is crossing the road), the priority may be set to the most important score ("100" in the table) to keep security of the person. On the other hand, when a person on the sidewalk is detected, a lower score ("40" in FIG. 11) is given than the most important score ("100" in FIG. 11) given to the person on the road.

As shown in the table, different priorities can be set for each of the left adjacent lane, the traveling lane, the right adjacent lane, and the other regions. For example, regarding bicycles and vehicles, the priority of the traveling lane is set to be higher than the priority of the left adjacent lane, the right adjacent lane, and the sidewalk. Further, different priorities can also be set according to types of the objects (persons, bicycles, and vehicles in FIG. 11). The table indicating these priorities may be changed for each region (for example, a town or a highway) in which the vehicle is traveling. In this way, the region subjected to high image quality processing is determined among many objects based on the priority so as to be less than the total amount of transmittable data determined based on the available bandwidth.

Figure 12:
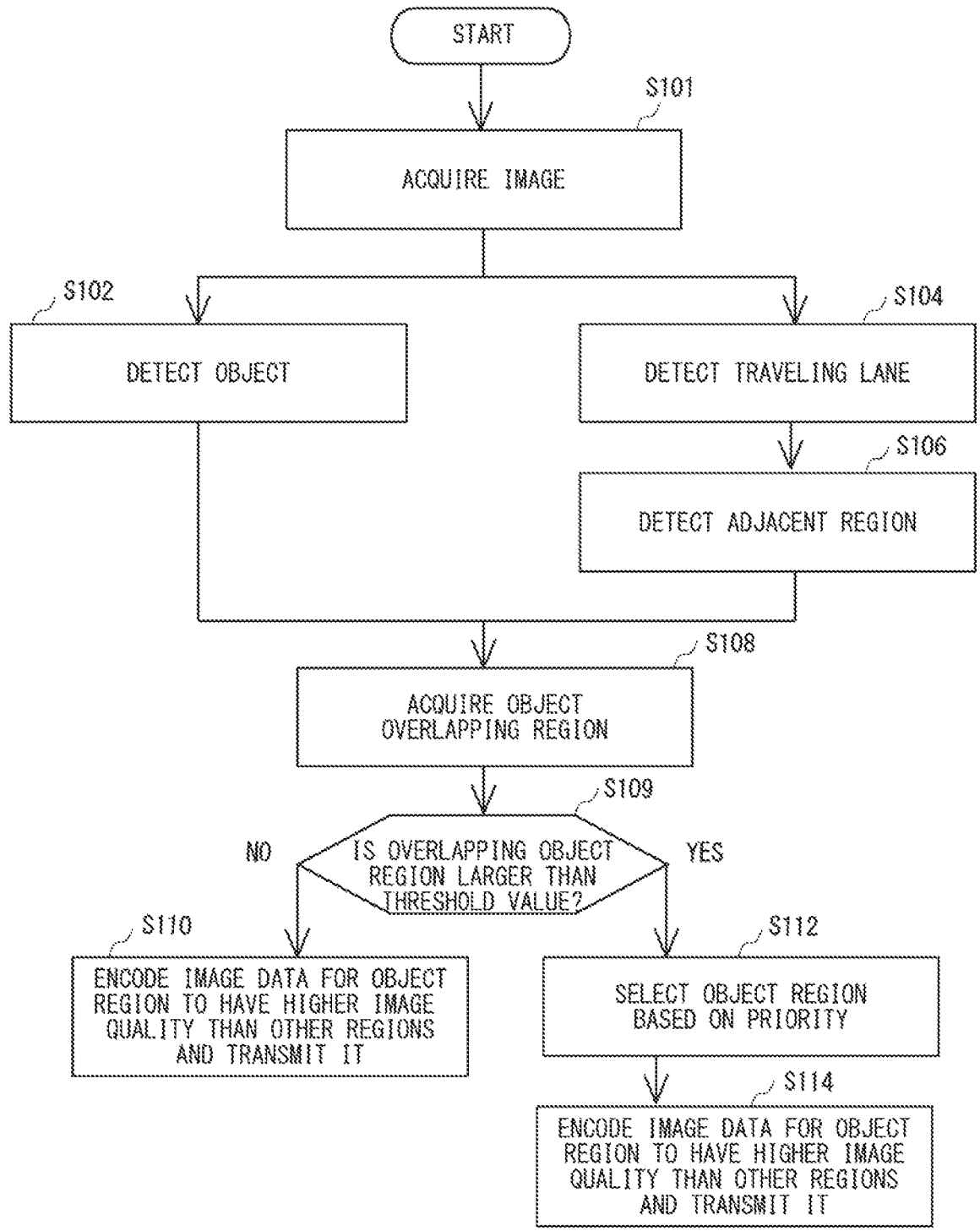
FIG. 12 is a flowchart showing an information processing method according to the third example embodiment.

FIG. 12 is a flowchart of an information processing method according to the third example embodiment.

The information processing apparatus acquires an image from the in-vehicle camera (step S101). One or more objects are detected from the image (step S102). On the other hand, a traveling lane in which the vehicle is traveling is detected from the image (step S104). Further, adjacent lanes adjacent to the traveling lane or other regions (for example, sidewalks or roadside strips) adjacent to the traveling lane are detected as adjacent regions from the image (step S106). Parallel processing is shown herein from the viewpoint of reducing delay, but sequential processing may be performed. For example, steps S104 and S106 may be executed after step S102, or step S102 may be executed after steps S104 and S106 are executed.

One or more object regions overlapping the regions including the traveling lane and the adjacent regions are acquired (step S108). When the overlapping object regions (for example, the number of object regions or an area ratio of the object regions to the entire image) is smaller than a threshold (NO in step S109), image data for the object regions are encoded to make an image quality higher than other regions, and then are transmitted to the remote monitoring center (step S110).

When the overlapping object regions (for example, the number of object regions or an area ratio of the object regions to the entire image) is larger than the threshold (YES in step S109), one or more object regions are selected from many object regions so as to fall below the threshold based on the priority (step S112). Image data for the selected one or more object regions are encoded to make an image quality thereof higher than that for other regions, and then are transmitted to the remote monitoring center (step S114).

The information processing apparatus according to the third example embodiment described above selectively performs high image quality processing on the important region that affects the driving of the vehicle, thereby suppressing the available bandwidth and transmitting the image data to the remote monitoring center.

Fourth Example Embodiment

Figure 13:
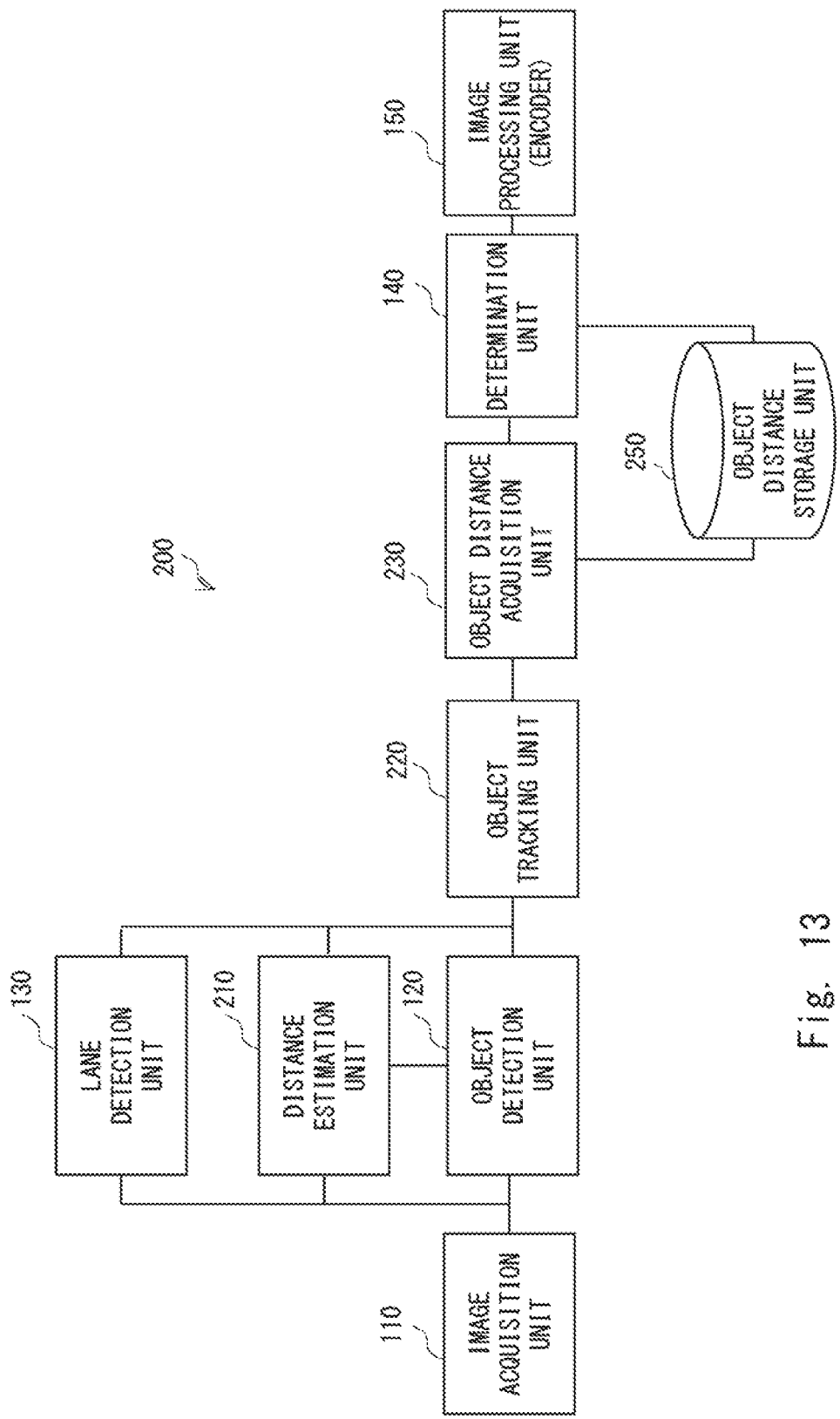
FIG. 13 is a block diagram showing a configuration of an information processing apparatus according to a fourth example embodiment.

FIG. 13 is a block diagram showing a configuration of an information processing apparatus according to a fourth example embodiment.

The information processing apparatus according to the present example embodiment not only detects an object in an image, but also tracks the detected object, estimates a distance between the vehicle and the object, and determines the above-described priority according to the estimated distance. For example, when another object vehicle traveling in front of the vehicle suddenly stops, that is, when a distance between the vehicle and the object vehicle is rapidly reduced, the priority of the object vehicle is increased, and can be determined to be a region subjected to high image quality processing. Specifically, the information processing apparatus 200 includes an acquisition unit 110, an object detection unit 120, a distance estimation unit 210, an object tracking unit 220, object distance acquisition unit 230, an object distance storage unit 250, a determination unit 240, and an image processing unit (encoder) 150.

The object detection unit 120 detects one or more objects in the image, assigns an object ID to each object, and manages the objects. The distance estimation unit 210 estimates a distance between the detected object in the image and the vehicle. For example, the distance can be estimated from the size of the object in the image. The estimated distance is stored in the object distance storage unit 250 together with the object ID and time. FIG. 14 shows an example of a table in which vehicles, objects, and distances are managed.

Figure 15:
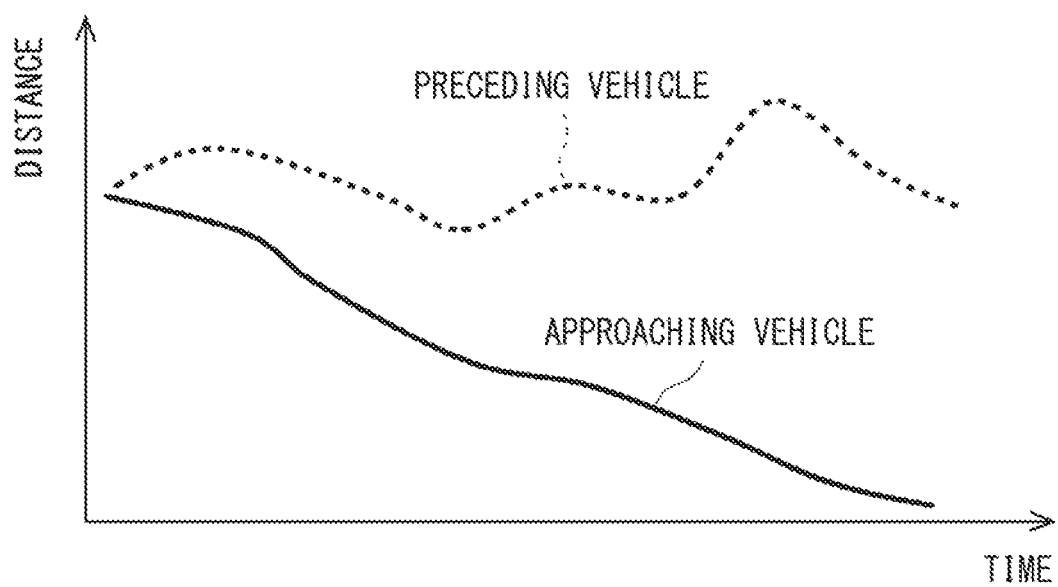
FIG. 15 is a graph showing a distance between a vehicle and an object over time.

The object tracking unit 220 tracks one or more objects detected in the image, and acquires an object ID for the object being tracked. In other words, the object tracking unit 220 can track the object in the image even when the vehicle is moving or the object is moving. The object distance acquisition unit 230 can calculate the amount of change between the object distance at the past time and the object distance at the present time, from the object ID of the detected object. FIG. 15 is a graph showing a distance between the vehicle and the object over time. In FIG. 15, a solid line indicates an approaching vehicle, and a dashed line indicates a preceding vehicle keeping a predetermined inter-vehicle distance. The determination unit 240 considers a change in the distance between the vehicle and the object in addition to the above-described priority when determining the region subjected to high image quality processing from many detected object regions. In other words, the determination unit 240 determines that the approaching object is a region that is highly likely to affect the driving of the vehicle and thus is subjected to high image quality processing. In other words, the determination unit 240 determines to divide the image including one or more objects into a region subjected to high image quality processing and a region subjected to low image quality processing. In the priority table shown in FIG. 11, for example, the determination unit 140 adds a score of priority (for example, "+20" in a case of an approaching vehicle in the traveling lane or the left adjacent lane) to the approaching vehicle.

Figure 16:
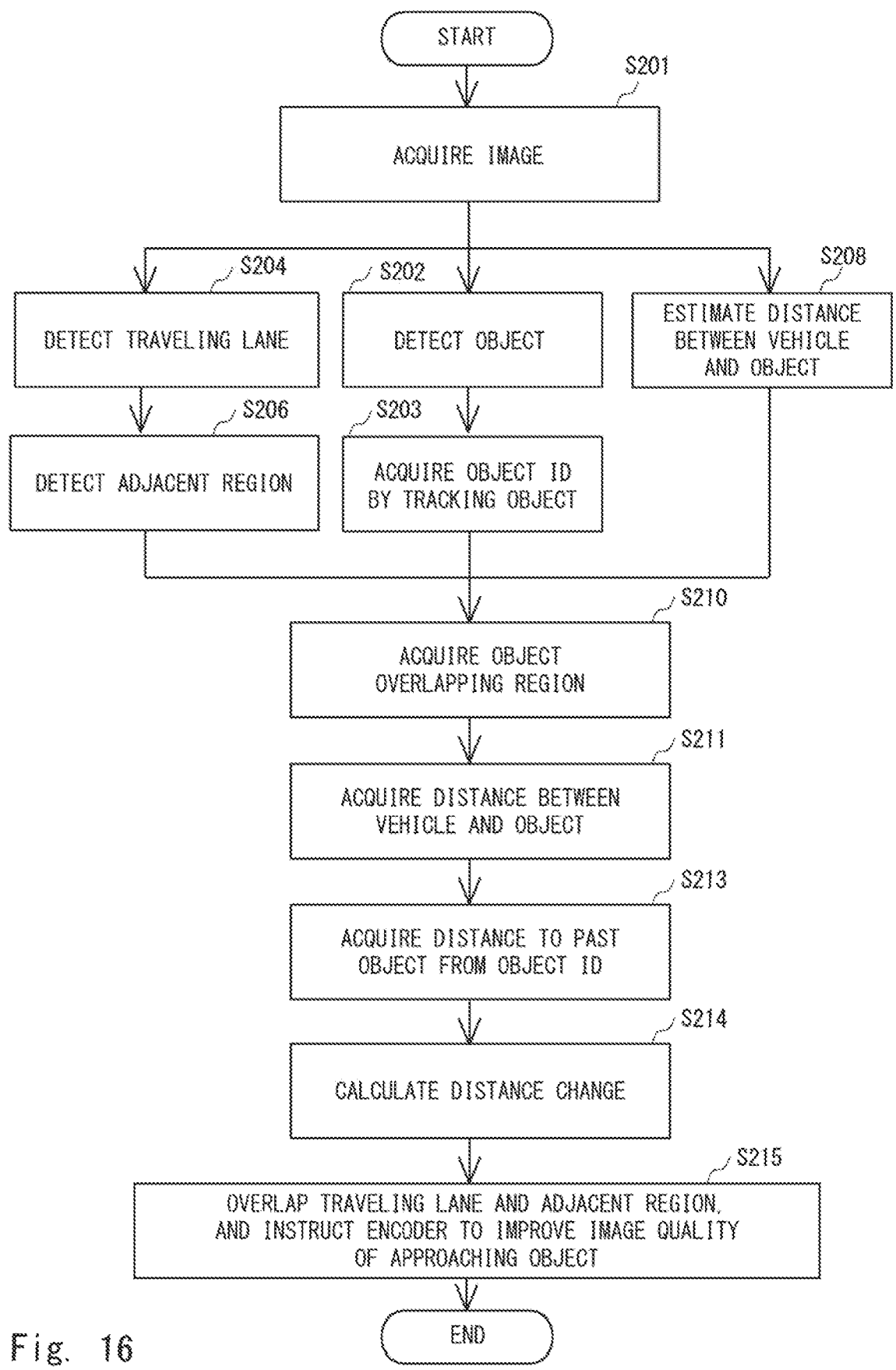
FIG. 16 is a flowchart for describing an object tracking and a distance estimation according to the fourth example embodiment.

FIG. 16 is a flowchart for describing the object tracking and the distance estimation according to the fourth example embodiment.

The information processing apparatus acquires an image from the in-vehicle camera or the like (step S201). One or more objects are detected from the image (step S202). Further, an object ID of the object is acquired by tracking of the object (step S203).

On the other hand, a traveling lane in which the vehicle is traveling is detected from the image (step S204). Further, adjacent lanes adjacent to the traveling lane or other regions (for example, sidewalks or roadside strips) adjacent to the traveling lane are detected as adjacent regions from the image (step S206). In the present example embodiment, a distance between the vehicle and the object is estimated (step S208). The estimated distance is stored in the object distance storage unit 250 together with the acquisition time. Parallel processing is shown herein from the viewpoint of reducing delay, but sequential processing may be performed. For example, steps S202, S203, and S208 may be executed after steps S204 and S206 are executed, or steps S204 and S206 may be executed after steps S202, S203, and S208 are executed.

One or more object regions overlapping the regions including the traveling lane and the adjacent regions are acquired (step S210). In the present example embodiment, when the overlapping object regions (for example, the number of object regions or an area ratio of the object regions to the entire image) is larger than a threshold, one or more object regions are selected from many object regions so as to fall below the threshold based on the amount of change in distance between the object and the vehicle and the above-described priority.

First, a distance between the vehicle and the object at the present time is acquired (step S211). Next, from the object ID, a distance between the vehicle and the object at the past time is acquired from the object distance storage unit 250 (step S213). The amount of change between the distance between the vehicle and the object at the present time and the distance between the vehicle and the object at the past time is calculated (step S214). An approaching object is discriminated from the amount of change in the distance between the vehicle and the object. As described above, one or more object regions are selected from many object regions so as to fall below the threshold, based on the above-described priority and the approaching object. Image data for the selected one or more object regions are encoded to make an image quality higher than other regions, and then are transmitted to the remote monitoring center (step S215).

The information processing apparatus according to the third example embodiment described above selectively performs high image quality processing on the important region that affects the driving of the vehicle while considering the distance between the vehicle and the object, thereby suppressing the available bandwidth and transmitting the image data to the remote monitoring center.

Another Modified Example

In modified example, an optimum ROI determination program is selected according to external environment of the vehicle that is traveling. For example, an ROI determination program A is a program optimized for highways or the like. In other words, on the highways, since persons do not cross the road and bicycles do not travel on the road, higher priority is given to a preceding vehicle and a vehicle that is likely to change a lane. On the other hand, an ROI determination program B is a program optimized for residential areas or the like. In other words, on the residential areas, since there are many pedestrians and bicycles and there is a high possibility that persons can affect the traveling of the vehicle, higher priority is given to persons such as pedestrians and bicycles. The modified example can be applied particularly to the third, fourth, and fifth example embodiments described above.

Figure 17:
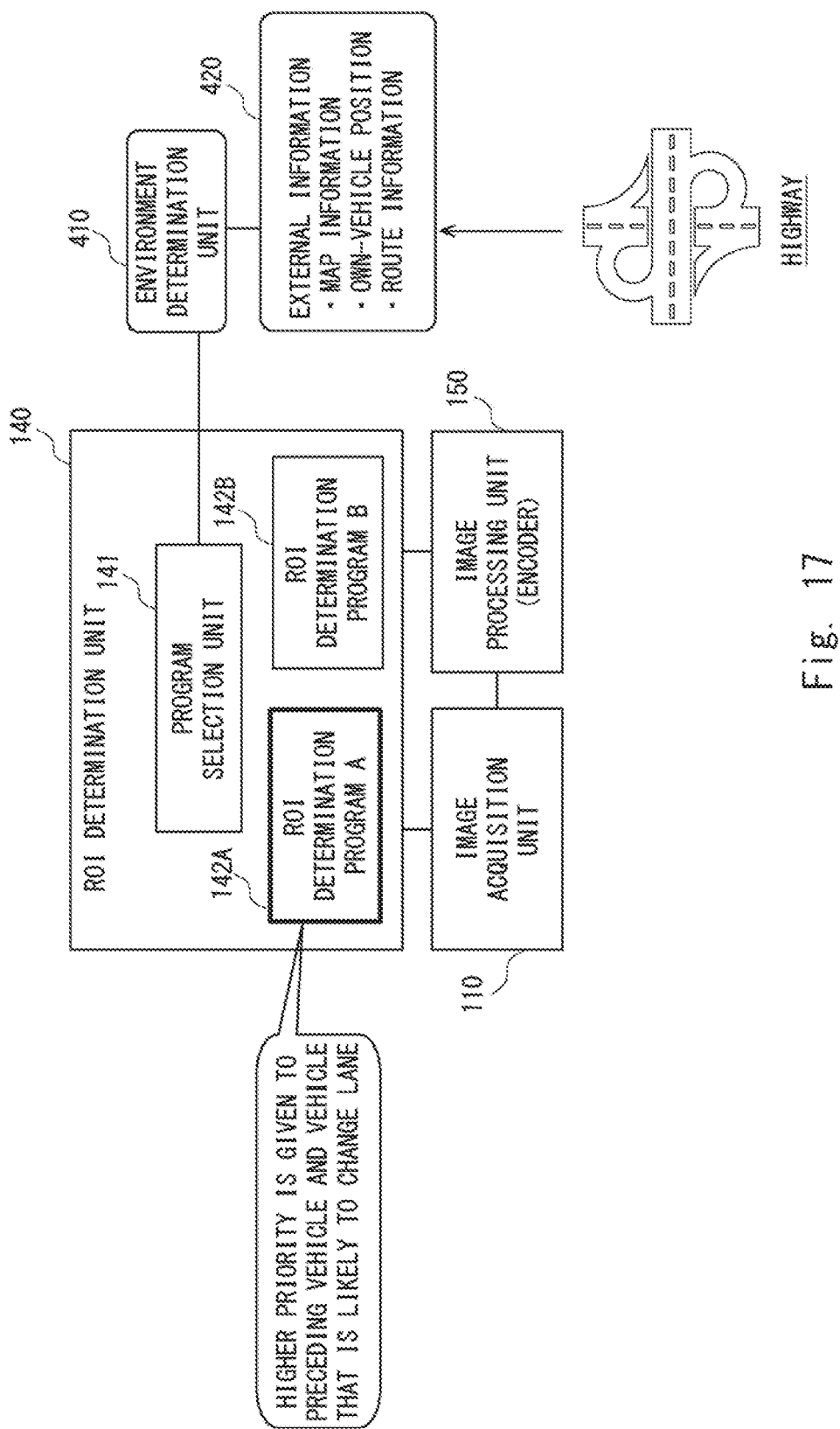
FIG. 17 is a schematic diagram for describing another modified example.
Figure 18:
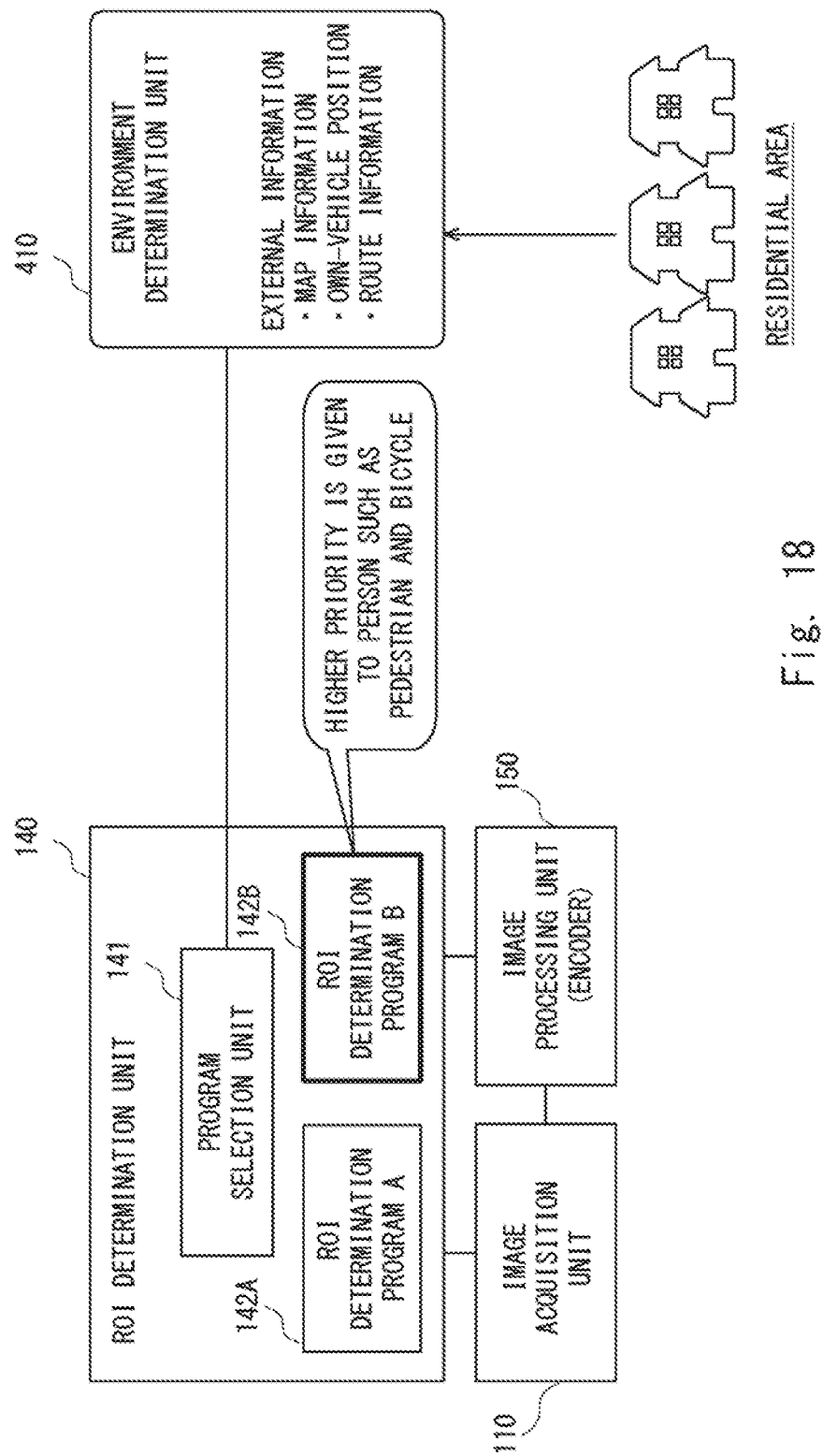
FIG. 18 is a schematic diagram for describing another modified example.

FIGS. 17 and 18 are block diagrams showing in detail a configuration of a determination unit 140 according to the present modified example. FIG. 17 shows an example of detecting that the vehicle is traveling in a first environment (for example, a highway) and selecting an ROI determination program suitable for the first environment. FIG. 18 shows an example of detecting that the vehicle is traveling in a second environment (for example, a residential area) and selecting an ROI determination program suitable for the second environment.

An environment determination unit 410 determines an environment, in which the own vehicle is present, based on external information 420 regarding a position of the own vehicle, map information, route information, and acquired images or the like. Such external information 420 can be acquired as navigation information from a general car navigation system. Out of the external information 420, the position information of the own vehicle can be acquired from position information from a GPS (Global Positioning System) receiver, for example. Examples of the environments include highways and residential areas, but are not limited thereto. For example, the environment determination unit 410 may determine the presence or absence of a road on which persons rarely walk (for example, a mountain road), the number of lanes (for example, one-lane, two-lanes, or three or more-lanes per one direction), the presence or absence of a sidewalk, and a presence or absence of a median strip.

A program selection unit 141 selects an optimum program from a plurality of programs prepared in advance based on the determined environment. The plurality of programs prepared in advance are programs for determining a region subjected to high image quality processing from a large number of detected object regions (or ROIs) according to the priority optimized for each environment.

Figure 19:
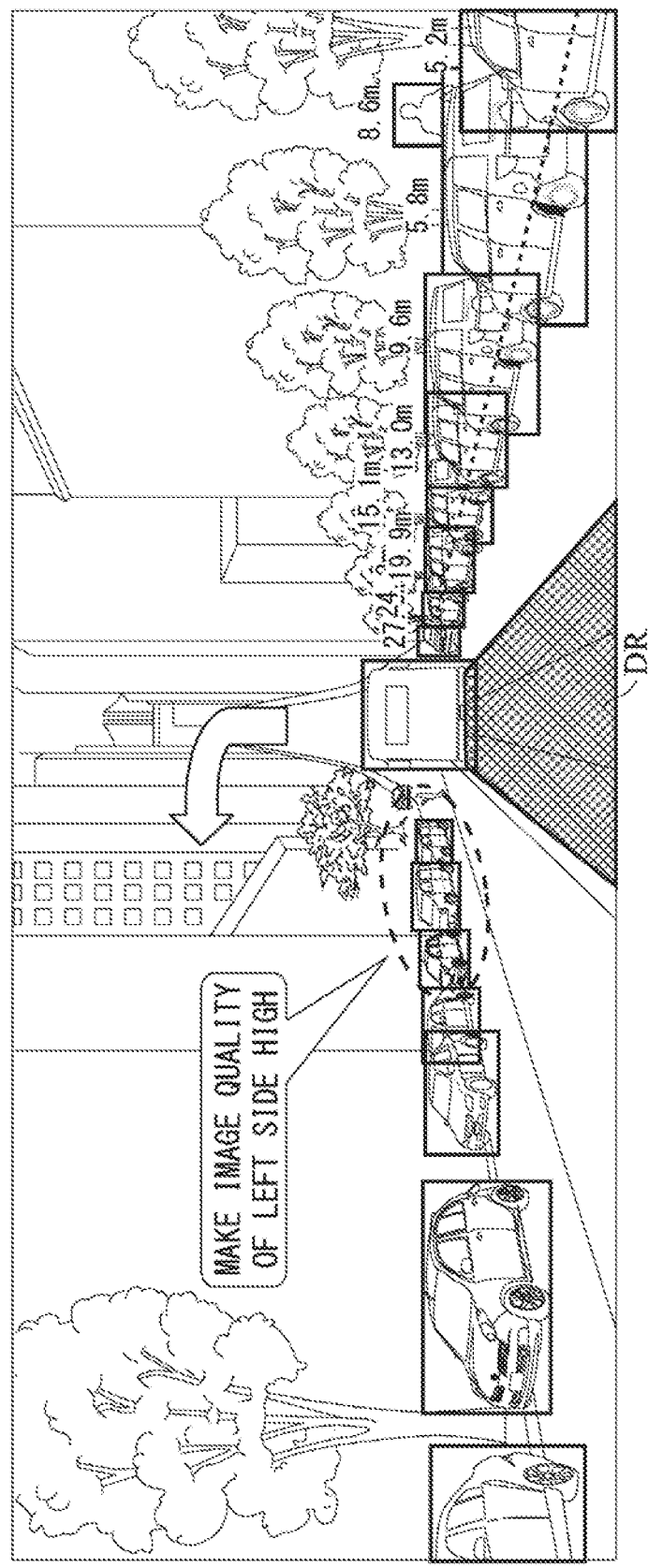
FIG. 19 is a schematic diagram for describing another modified example.

FIG. 19 is a schematic diagram for describing another modified example.

In the present modified example, when the vehicle crosses an oncoming vehicle lane during a left turn, a region subjected to high image quality processing may be switched such that an opposite lane (oncoming lane) instead of the own lane (traveling lane) becomes a region subjected to high image quality processing. For example, the determination unit may set the priority of the opposite lane to be higher than the priority of the own lane (traveling lane).

In another modified example, when the vehicle crosses an oncoming vehicle lane during a right turn, the determination unit may switch a region subjected to high image quality processing such that the opposite lane (oncoming lane) instead of the own lane (traveling lane in which the vehicle is traveling before turning right) becomes a region subjected to high image quality processing.

Further, when the vehicle changes a lane from the traveling lane to the adjacent lane, the adjacent lane (lane for a moving destination) in addition to the traveling lane may also be switched to be a region subjected to high image quality processing. In this case, for example, the priority of the adjacent lane (lane for a moving destination) may be set to be higher than the priority of the traveling lane.

In another modified example, when there is a crosswalk without traffic lights, the priority may be switched such that not a vehicle ahead of the crosswalk but an object (for example, a person or a bicycle) near the crosswalk (adjacent region) adjacent to the traveling region is a region subjected to high image quality processing. In this case, the priority of the object near the crosswalk adjacent to the traveling region may be set to be higher than the priority of an object located in the traveling region (traveling lane) farther from the vehicle than the crosswalk.

Figure 20:
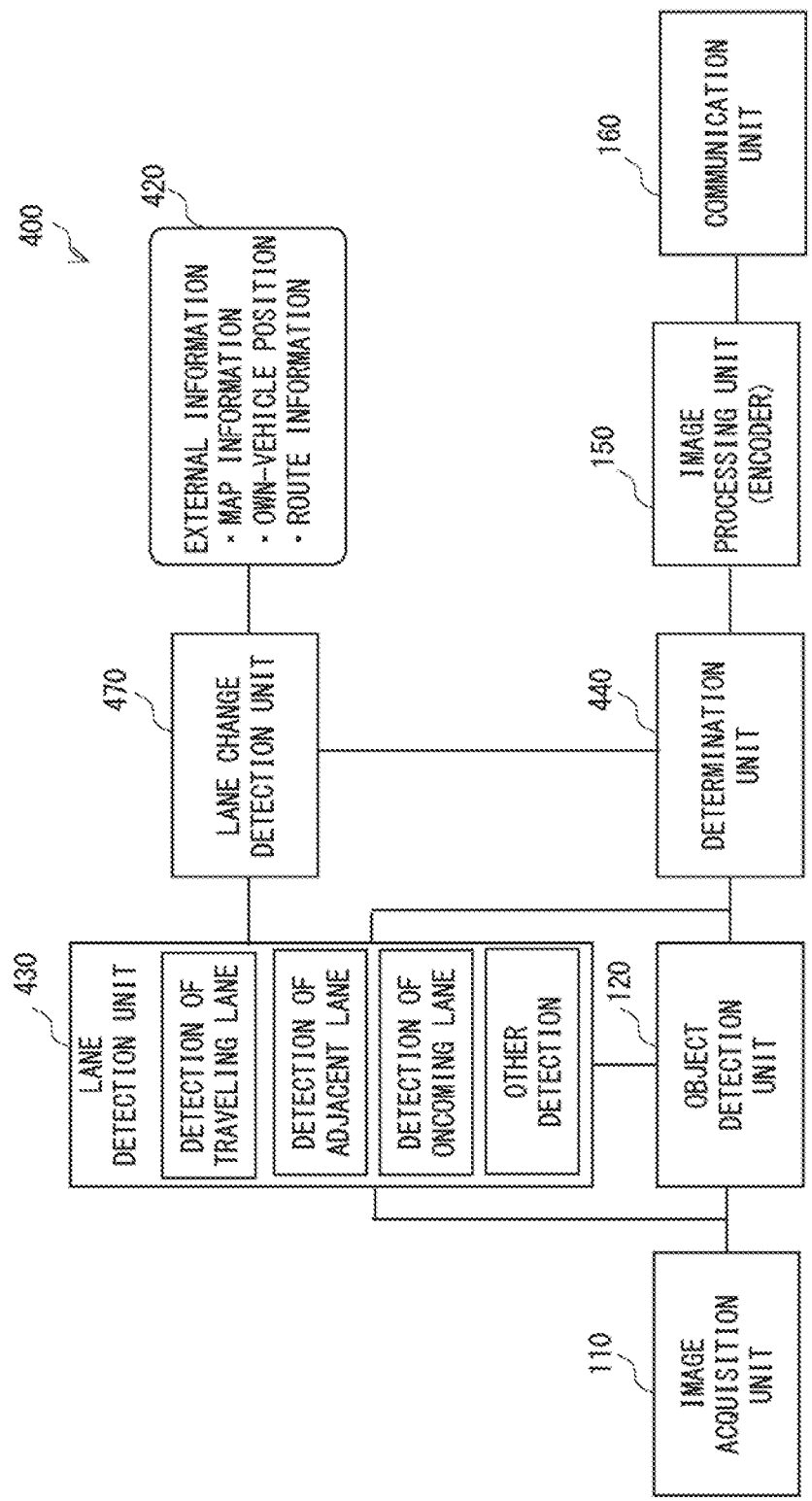
FIG. 20 is a block diagram showing a configuration of an information processing apparatus according to the modified example shown in FIG. 18.

FIG. 20 is a block diagram showing a configuration of an information processing apparatus according to the modified example of FIG. 19.

An information processing apparatus 400 includes an image acquisition unit 110, an object detection unit 120, a lane detection unit 430, a lane change detection unit 470, external information 420, a determination unit 440, an image processing unit (encoder) 150, and a communication unit 160.

The information processing apparatus 400 according to the present modified example includes the lane change detection unit 470 (also referred to as a traveling region change detection unit) that detects that the vehicle has changed lanes. For example, the lane change detection unit 470 detects a movement (lane change) from the traveling lane to an adjacent lane, or a right or left turn at an intersection. The lane change detection unit 470 acquires external information 420 such as route information, and can determine a lane change and a right or left turn based on the external information 420. Alternatively, the lane change detection unit 470 may detect a lane change by receiving steering information from the vehicle via a CAN (Controller Area Network).

The lane detection unit 430 can also detect an oncoming lane based on the detection result of the lane change detection unit 470, in addition to the function of the lane detection unit of the above-described example embodiments. The lane detection unit 430 may detect the oncoming lane as an adjacent region during a left or right turn or a lane change.

The determination unit 440 can determine an image processing region, on which image processing is performed, from one or more object regions, based on the traveling region (the traveling lane in the present example) and the adjacent region (the oncoming lane in the present example). In the present example, since the oncoming lane is also an adjacent region, one or more objects included in the oncoming lane can also be determined as regions subjected to high image quality processing.

Alternatively, the determination unit 440 may change the priority based on the detection result of the lane change detection unit 470. For example, when determining that a right or left turn will occur, the determination unit 440 may change the priority such that the priority of the oncoming lane is higher than the priority of the traveling lane, during the right or left turn. Further, for example, when determining that the vehicle changes lanes based on the steering information received from the vehicle, the determination unit 440 may set the priority of the lane for a moving destination to the same level as the priority of the traveling lane, or may set it to be equal to or higher than the priority of the traveling lane.

In addition, the lane detection unit 430 or the object detection unit 120 can also detect a crosswalk. When the crosswalk is detected, the lane detection unit 430 may detect left and right regions near the crosswalk as adjacent regions.

The determination unit 440 can determine an image processing region, on which image processing is performed, from one or more object regions, based on the traveling region (the traveling lane in the present example) and the adjacent regions (the left and right regions near the crosswalk in the present example). In the present example, since the left and right regions near the crosswalk are also adjacent regions, one or more objects included in the left and right regions near the crosswalk can also be determined as regions subjected to high image quality processing.

In the above-described example embodiments, the information processing apparatus 100 is provided with a plurality of components (for example, the acquisition unit 11, the object detection unit 12, the traveling region specifying unit 13, and the determination unit 15 shown in FIG. 1, or the image acquisition unit 110, the object detection unit 120, the lane detection unit 130, the determination unit 140, the encoder 150, and the communication unit 160 shown in FIG. 9), but is not limited thereto. The components provided in the information processing apparatus 100 are not limited to being provided in one apparatus, and may be provided in a plurality of apparatuses in a distributed manner. For example, the lane detection unit 130 may be provided in an external apparatus, and the object detection unit 120 may determine an object for image processing based on the result of the lane detection previously performed by the lane detection unit 130.

In the description, a method has been described for specifying the traveling region and determining the image processing region on which the image processing is performed based on the specified traveling region, but the determining the image processing region is not limited to the determining based on the traveling region. For example, the image processing region, on which the image processing is performed, may be determined based on a traveling state. The traveling state indicates a state where the vehicle is traveling, and includes a lane in which the vehicle is traveling, a traveling direction, and a speed, for example.

For example, a situation in which the vehicle is turning right may be regarded as a traveling state, the lane of the crossing oncoming vehicle (lane of the oncoming vehicle) may be detected as a left adjacent lane, and the target object on the left adjacent lane may be determined as an image processing region.

For example, when the vehicle is turning right at a crossroad, a direction in which the vehicle is turning to the right may be detected as a traveling state, and a target object (for example, a vehicle that goes straight into the road on which it turns right and intrude) facing the same direction may be detected and may be regarded as an image processing region. When the vehicle is traveling straight, a bicycle advancing rightward (facing in a direction intersecting the direction in which the vehicle is traveling straight) may be detected and may be regarded as an image processing region.

For example, when the vehicle is traveling at a speed of 15 km/h, a smaller region may be selected than the image processing region determined when the vehicle is traveling at a speed of 30 km/h. For example, a situation in which the vehicle is traveling at a speed of 30 km/h is taken as a traveling state, and an object up to 100 m ahead may be selected as an image processing region, but when the vehicle is traveling at a speed of 15 km/h, an object up to 50 m ahead may be selected as an image processing region (a target object beyond 50 m is not selected as an image processing region). Although specific distances are described for simplification of the description, the distance to the target object may be determined by the method described in the fourth example embodiment, and is not limited thereto.

Furthermore, the traveling state may include a plurality of indicators. For example, in a case of detecting a bicycle (a bicycle traveling in the opposite direction on the road, or the like) facing in a direction opposite to the direction in which the vehicle is going straight when the vehicle is traveling at a speed of 30 km/h, the bicycle may be selected as an image processing region (it may be determined that the bicycle is not selected as an image processing region when the vehicle is traveling at a speed of 10 km/h).

Figure 21:
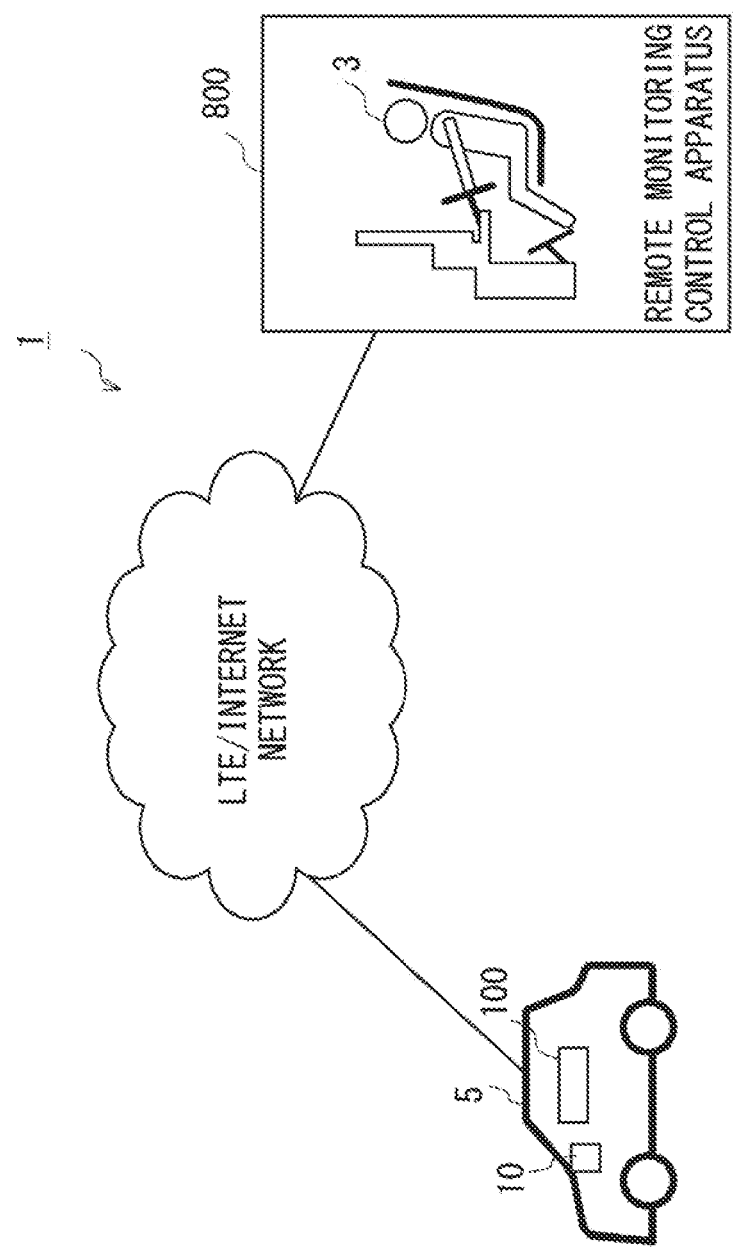
FIG. 21 is a block diagram showing a configuration of an information processing system (or an image transmission system) according to another example embodiment.

FIG. 21 is a block diagram showing a configuration of an information processing system (or an image processing system) according to another example embodiment.

The information processing system includes an information processing apparatus 100 mounted on a vehicle and a remote monitoring control apparatus 800 communicably connected to the information processing apparatus 100 via a network. The network may be, for example, a network using a communication line standard such as LTE (Long Term Evolution), and may include a wireless communication network such as WiFi (registered trademark) or a 5G wireless communication system.

The information processing apparatus 100 includes an acquisition unit 11 that acquires an image captured by an image capturing unit mounted on a vehicle, an object detection unit 12 that detects one or more objects in the acquired image, a traveling region specifying unit 13 that specifies a traveling region, in which the vehicle is traveling, from the region in the acquired image, and a determination unit 15 that determines, based on the traveling region, an image processing region, which is subjected to image processing, from regions of the one or more objects. As shown in FIG. 9 and others, the information processing apparatus 100 further includes an image processing unit 150 that performs image processing on the determined image processing region and a communication unit 160 that transmits image data after image processing to the remote monitoring control apparatus 800.

The information processing system can specify an object in the image that can affect the traveling of the vehicle. Further, the image transmission system performs image processing on the appropriate region, which may affect the driving of the vehicle, while suppressing the available bandwidth, and transmits the image data after image processing to the remote monitoring control apparatus, thereby enabling remote monitoring and remoter control of the vehicle.

Note that FIG. 21 shows the information processing apparatus 100 including the acquisition unit 11, the object detection unit 12, the traveling region specifying unit 13, and the determination unit 15, but these units may be implemented as a system mounted on different apparatuses. For example, an apparatus mounted with the acquisition unit 11 and the object detection unit 12 and an apparatus including the traveling region specifying unit 13 and the determination unit 15 may be configured to communicate with each other via a network.

In the example embodiments described above, the remote driver 3 remotely operates the unmanned operation vehicle 5 in the information processing system and the remote monitoring operation system, but is not limited thereto. For example, a totalized control apparatus may be provided to totally control the unmanned operation vehicle 5. The totalized control apparatus may generate information for autonomous driving of the unmanned operation vehicle 5 based on the information acquired from the unmanned operation vehicle 5, and the unmanned operation vehicle 5 may operate according to the information.

Figure 22:
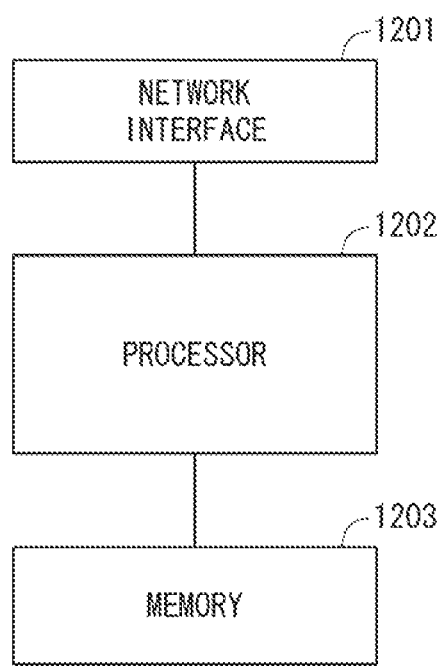
FIG. 22 is a block diagram showing a hardware configuration example of the information processing apparatus and the like according to some example embodiments.

FIG. 22 is a block diagram showing a hardware configuration example of the information processing apparatuses 100, 200, and 400, and the remote monitoring control apparatus 800 (hereinafter, referred to as the information processing apparatus 100 or the like). Referring to FIG. 22, the information processing apparatus 100 or the like includes a network interface 1201, a processor 1202, and a memory 1203. The network interface 1201 is used to communicate with other network node apparatuses constituting a communication system. The network interface 1201 may be used to perform wireless communication. For example, the network interface 1201 may be used for wireless LAN communication defined in IEEE 802.11 series or mobile communication defined in 3 GPP (3rd Generation Partnership Project). Alternatively, the network interface 1201 may include, for example, a network interface card (NIC) conforming to the IEEE 802.3 series.

The processor 1202 reads software (computer program) from the memory 1203 and executes the software to perform the process of the information processing apparatus 100 described using the flowchart or the sequence in the above-described example embodiments. The processor 1202 may be, for example, a microprocessor, MPU (Micro Processing Unit), or CPU (Central Processing Unit). The processor 1202 may include a plurality of processors.

The memory 1203 is configured by a combination of a volatile memory (RAM (Random Access Memory)) and a nonvolatile memory (ROM (Read Only Memory)). The memory 1203 may include a storage arranged away from the processor 1202. In this case, the processor 1202 may access the memory 1203 through an I/O interface (not shown). For example, the memory 1203 does not necessarily have to be part of the apparatus, and may be an external storage apparatus or a cloud storage connected to the computer apparatus 500 via a network.

In the example of FIG. 22, the memory 1203 is used to store software modules. The processor 1202 can read these software modules from the memory 1203 and execute these software modules to perform the process of the information processing apparatus 100 or the like described in the above-described example embodiments.

As described with reference to FIG. 22, each of the processors included in the information processing apparatus 100 or the like executes one or a plurality of programs including instructions for causing a computer to perform the algorithm described with reference to the drawings.

Note that each of the processes described with reference to the above flowchart does not necessarily need to be handled in line with the order mentioned in the flowchart along the time series. A process executed in parallel or separately (e.g., a parallel process or an object process) is also included. In addition, as for a program, a single CPU may be employed for the process thereof, or alternatively, a plurality of CPUs may be employed for the distributed processes thereof.

In the above-described example, the program may be stored and supplied to a computer using various types of non-transitory computer-readable media. The non-transitory computer-readable media include various types of tangible storage media. Examples of the non-transitory computer-readable media include a magnetic recording medium, a magneto-optic recording medium (for example, a magneto-optic disk), a CD-ROM (Read Only Memory), a CD-R, a CD-R/W, and a semiconductor memory. The magnetic recording medium may be, for example, a flexible disk, a magnetic tape, and a hard disk drive. The semiconductor memory may be, for example, a mask ROM, a PROM (Programmable ROM), an EPROM (Erasable PROM), a flash ROM, and a RAM (Random Access Memory). These programs may be supplied to computers using various types of transitory computer-readable media. Examples of the transitory computer-readable media include an electrical signal, an optical signal, and an electromagnetic wave. The transitory computer-readable media can supply programs to a computer through a wired communication line such as electric wires and optical fibers, or a wireless communication line.

The present invention is not limited to the above-described example embodiments, and can be appropriately modified without departing from the gist. The above-described example embodiments may be implemented in combination as appropriate.

Some or all of the above-described example embodiments may also be described as Supplementary notes to be described below, but are not limited thereto.

(Supplementary Note 1)

An information processing apparatus comprising:
an acquisition unit that acquires an image captured by an image capturing unit mounted on a vehicle;
an object detection unit that detects one or more objects in the acquired image;
a traveling region specifying unit that specifies a traveling region, in which the vehicle is traveling, from regions in the acquired image; and
a determination unit that determines, based on the traveling region, an image processing region, which is subjected to image processing, among regions of the one or more objects.

(Supplementary Note 2)

The information processing apparatus according to Supplementary note 1, further comprising
an adjacent region specifying unit that specifies, as a region adjacent to the traveling region, an adjacent region including one or more objects that may affect traveling of the vehicle, wherein
the determination unit determines, based on the traveling region and the adjacent region, an image processing region, which is subjected to image processing, among the regions of the one or more objects.

(Supplementary Note 3)

The information processing apparatus according to Supplementary note 2, wherein
the determination unit determines an image processing region to be subjected to image processing among the one or more object regions, based on a priority associated with a type of the object, the traveling region, and the adjacent region.

(Supplementary Note 4)

The information processing apparatus according to Supplementary note 1, wherein
the traveling region specifying unit detects a traveling lane.

(Supplementary Note 5)

The information processing apparatus according to Supplementary note 2, wherein
the adjacent region specifying unit detects an adjacent lane adjacent to the traveling lane.

(Supplementary Note 6)

The information processing apparatus according to any one of Supplementary notes 1 to 5, further comprising:
a distance acquisition unit that acquires a distance between the one or more objects and the vehicle; and a distance change amount calculation unit that calculates a distance change amount per unit time of the acquired distance, wherein the determination unit determines, among the one or more object regions, an image processing region to be subjected to higher image quality processing compared to other regions based on the distance change amount.

(Supplementary Note 7)

An image transmission system comprising:

an acquisition unit that acquires an image captured by an image capturing unit mounted on a vehicle;

an object detection unit that detects one or more objects in the acquired image;

a traveling region specifying unit that specifies a traveling region, in which the vehicle is traveling, from regions in the acquired image; and a determination unit that determines, based on the traveling region, an image processing region, which is subjected to image processing, among regions of the one or more objects.

(Supplementary Note 8)

The image transmission system according to Supplementary note 7, further comprising an adjacent region specifying unit that specifies, as a region adjacent to the traveling region, an adjacent region including one or more objects that may affect traveling of the vehicle, wherein the determination unit determines, based on the traveling region and the adjacent region, an image processing region, which is subjected to image processing, among the regions of the one or more objects.

(Supplementary Note 9)

The image transmission system according to Supplementary note 8, wherein the determination unit determines an image processing region to be subjected to image processing among the one or more object regions, based on a priority associated with a type of the object, the traveling region, and the adjacent region.

(Supplementary Note 10)

The image transmission system according to Supplementary note 7, wherein the traveling region specifying unit detects a traveling lane.

(Supplementary Note 11)

The image transmission system according to Supplementary note 8, wherein the adjacent region specifying unit detects an adjacent lane adjacent to the traveling lane.

(Supplementary Note 12)

The image transmission system according to Supplementary note 11, wherein the adjacent region specifying unit detects a roadside strip or a sidewalk adjacent to the traveling lane or the adjacent lane.

(Supplementary Note 13)

The image transmission system according to any one of Supplementary notes 7 to 12, further comprising:

a distance acquisition unit that acquires a distance between the one or more objects and the vehicle; and a distance change amount calculation unit that calculates a distance change amount per unit time of the acquired distance, wherein the determination unit determines, among the one or more object regions, an image processing region to be subjected to higher image quality processing compared to other regions based on the distance change amount.

(Supplementary Note 14)

An information processing method comprising:

acquiring an image captured by an image capturing unit mounted on a vehicle;

detecting one or more objects in the acquired image;

specifying a traveling region, in which the vehicle is traveling, from regions in the acquired image; and determining, based on the traveling region, an image processing region, which is subjected to image processing, among regions of the one or more objects.

(Supplementary Note 15)

The information processing method according to Supplementary note 14, further comprising:

specifying, as a region adjacent to the traveling region, an adjacent region including one or more objects that may affect traveling of the vehicle, and determining, based on the traveling region and the adjacent region, an image processing region, which is subjected to image processing, among the regions of the one or more objects.

(Supplementary Note 16)

The information processing method according to Supplementary note 15, further comprising determining an image processing region to be subjected to image processing among the one or more object regions, based on a priority associated with a type of the object, the traveling region, and the adjacent region.

(Supplementary Note 17)

The information processing method according to Supplementary note 14, further comprising detecting a traveling lane.

(Supplementary Note 18)

The information processing method according to Supplementary note 15, further comprising detecting an adjacent lane adjacent to the traveling lane.

(Supplementary Note 19)

The information processing method according to Supplementary note 18, further comprising detecting a roadside strip or a sidewalk adjacent to the traveling lane or the adjacent lane.

(Supplementary Note 20)

The information processing method according to any one of Supplementary notes 14 to 19, further comprising:

acquiring a distance between the one or more objects and the vehicle;

calculating a distance change amount per unit time of the acquired distance; and determining, among the one or more object regions, an image processing region to be subjected to higher image quality processing compared to other regions based on the distance change amount.

(Supplementary note 21)

A program causing a computer to execute functions of; acquiring an image captured by an image capturing unit mounted on a vehicle;

detecting one or more objects in the acquired image;

specifying a traveling region, in which the vehicle is traveling, from regions in the acquired image; and determining, based on the traveling region, an image processing region, which is subjected to image processing, among regions of the one or more objects.

(Supplementary Note 22)

The program according to Supplementary note 21, wherein the program causes the computer to execute functions of; specifying, as a region adjacent to the traveling region, an adjacent region including one or more objects that may affect traveling of the vehicle; and determining, based on the traveling region and the adjacent region, an image processing region, which is subjected to image processing, among the regions of the one or more objects.

(Supplementary note 23)

The program according to Supplementary note 22, wherein an image processing region to be subjected to image processing among the one or more object regions is determined based on a priority associated with a type of the object, the traveling region, and the adjacent region.

(Supplementary note 24)

The program according to Supplementary note 21, wherein the program causes the computer to execute a function of detecting a traveling lane.

(Supplementary Note 25)

The program according to Supplementary note 22, wherein the program causes the computer to execute a function of detecting an adjacent lane adjacent to the traveling lane.

(Supplementary Note 26)

The program according to Supplementary note 22, wherein the program causes the computer to execute a function of detecting a roadside strip or a sidewalk adjacent to the traveling lane or the adjacent lane.

(Supplementary Note 27)

The program according to any one of Supplementary notes 21 to 26, wherein the program causes the computer to execute function of; acquiring a distance between the one or more objects and the vehicle;
calculating a distance change amount per unit time of the acquired distance; and
determining, among the one or more object regions, an image processing region to be subjected to higher image quality processing compared to other regions based on the distance change amount.

Although the application invention has been described above with reference to the example embodiments (and examples), the application invention is not limited to the above-described example embodiments (and examples). The configurations and details of the application invention can be variously changed within the scope of the application invention to be capable of being understood by those skilled in the art.

REFERENCE SIGNS LIST

1 TRANSMISSION SYSTEM
3 REMOTE DRIVER
5 VEHICLE
10 IN-VEHICLE CAMERA
11 ACQUISITION UNIT
12 OBJECT DETECTION UNIT
13 TRAVELING REGION SPECIFYING UNIT
14 ADJACENT REGION SPECIFYING UNIT
15 DETERMINATION UNIT
100 INFORMATION PROCESSING APPARATUS
110 IMAGE ACQUISITION UNIT
120 OBJECT DETECTION UNIT
130 LANE DETECTION UNIT
140 DETERMINATION UNIT
150 IMAGE PROCESSING UNIT (ENCODER)
160 COMMUNICATION UNIT
200 INFORMATION PROCESSING APPARATUS
210 DISTANCE ESTIMATION UNIT
220 OBJECT TRACKING UNIT
230 OBJECT DISTANCE ACQUISITION UNIT
250 OBJECT DISTANCE STORAGE UNIT
400 INFORMATION PROCESSING APPARATUS
410 ENVIRONMENT DETERMINATION UNIT
420 EXTERNAL INFORMATION
430 LANE DETECTION UNIT
440 DETERMINATION UNIT
470 LANE CHANGE DETECTION UNIT
800 REMOTE MONITORING CONTROL APPARATUS

What is claimed is:

1. An information processing apparatus comprising:
at least one memory storing instructions, and
at least one processor configured to execute the instructions to;
acquire, as an acquired image, an image captured by an image capturing unit mounted on a vehicle;
detect one or more objects in the acquired image;
specify a traveling region, in which the vehicle is traveling, from regions in the acquired image;
specify an adjacent region adjacent to the traveling region, from the regions in the acquired image;
determine one or more object regions, among the one or more detected objects, which overlap the traveling region, the adjacent region, and other predetermined regions on a road, as one or more of the regions to be subjected to higher image quality processing compared to other regions; and
based on the one or more objects being a plurality of objects being detected, select one or more regions of the plurality of objects based on a priority associated with the traveling region, the adjacent region, the other predetermined regions on the road, and types of the plurality of objects, the priority being determined in accordance with whether or not driving of the vehicle is affected.

2. The information processing apparatus according to claim 1, wherein the at least one processor is further configured to execute the instructions to:
determine, based on the traveling region and the adjacent region, an image processing region, which is subjected to image processing, among the regions of the one or more objects.

3. The information processing apparatus according to claim 2, wherein
the at least one processor is further configured to execute the instructions to determine the image processing region to be subjected to image processing among the one or more object regions, based on the priority.

4. The information processing apparatus according to claim 1, wherein
the at least one processor is further configured to execute the instructions to detect a traveling lane.

5. The information processing apparatus according to claim 4, wherein
the at least one processor is further configured to execute the instructions to detect an adjacent lane adjacent to the traveling lane.

6. The information processing apparatus according to claim 1, wherein the at least one processor is further configured to execute the instructions to;
acquire a distance between the one or more objects and the vehicle;
calculate a distance change amount per unit time of the distance between the one or more objects and the vehicle; and
determine, among the one or more object regions, an image processing region to be subjected to the higher image quality processing compared to other regions based on the distance change amount.

7. An image transmission system comprising:
at least one memory storing instructions, and
at least one processor configured to execute the instructions to;
  acquire, as an acquired image, an image captured by an image capturing unit mounted on a vehicle;
  detect one or more objects in the acquired image;
  specify a traveling region, in which the vehicle is traveling, from regions in the acquired image;
  specify an adjacent region adjacent to the traveling region, from the regions in the acquired image;
  determine one or more object regions, among the one or more detected objects, which overlap the traveling region, the adjacent region, and other predetermined regions on a road, as one or more of the regions to be subjected to higher image quality processing compared to other regions; and
  based on the one or more objects being a plurality of objects being detected, select one or more regions of the plurality of objects based on a priority associated with the traveling region, the adjacent region, the other predetermined regions on the road, and types of the plurality of objects, the priority being determined in accordance with whether or not driving of the vehicle is affected.

8. The image transmission system according to claim 7, wherein the at least one processor is further configured to execute the instructions to;
  determine, based on the traveling region and the adjacent region, an image processing region, which is subjected to image processing, among the regions of the one or more objects.

9. The image transmission system according to claim 8, wherein
  the at least one processor is further configured to execute the instructions to determine the image processing region to be subjected to image processing among the one or more object regions, based on the priority.

10. The image transmission system according to claim 7, wherein
  the at least one processor is further configured to execute the instructions to detect a traveling lane.

11. The image transmission system according to claim 10, wherein
  the at least one processor is further configured to execute the instructions to detect an adjacent lane adjacent to the traveling lane.

12. The image transmission system according to claim 11, wherein
  the at least one processor is further configured to execute the instructions to detect a roadside strip or a sidewalk adjacent to the traveling lane or the adjacent lane.

13. The image transmission system according to claim 7, wherein the at least one processor is further configured to execute the instructions to;
  acquire a distance between the one or more objects and the vehicle;
  calculate a distance change amount per unit time of the distance between the one or more objects and the vehicle; and
  determine, among the one or more object regions, an image processing region to be subjected to the higher image quality processing compared to other regions based on the distance change amount.

14. An information processing method comprising:
  acquiring, as an acquired image, an image captured by an image capturing unit mounted on a vehicle;
  detecting one or more objects in the acquired image;
  specifying a traveling region, in which the vehicle is traveling, from regions in the acquired image;
  specifying, as an adjacent region adjacent to the traveling region, from the regions in the acquired image;
  determining one or more object regions, among the one or more detected objects, which overlap the traveling region, the adjacent region, and other predetermined regions on a road as one or more of the regions to be subjected to higher image quality processing compared to other regions; and
  based on the one or more objects being a plurality of objects being detected, selecting one or more regions of the plurality of objects based on a priority associated with the traveling region, the adjacent region, the other predetermined regions on the road, and types of the plurality of objects, the priority being determined in accordance with whether or not driving of the vehicle is affected.

15. The information processing method according to claim 14, further comprising:
  determining, based on the traveling region and the adjacent region, an image processing region, which is subjected to image processing, among the regions of the one or more objects.

16. The information processing method according to claim 15, further comprising:
  determining the image processing region to be subjected to image processing among the one or more object regions, based on the priority.

17. The information processing method according to claim 14, further comprising:
  detecting a traveling lane.

18. The information processing method according to claim 17, further comprising:
  detecting an adjacent lane adjacent to the traveling lane.

19. The information processing method according to claim 18, further comprising:
  detecting a roadside strip or a sidewalk adjacent to the traveling lane or the adjacent lane.

20. The information processing method according to claim 14, further comprising:
  acquiring a distance between the one or more objects and the vehicle;
  calculating a distance change amount per unit time of the distance between the one or more objects and the vehicle; and
  determining, among the one or more object regions, an image processing region to be subjected to the higher image quality processing compared to other regions based on the distance change amount.

* * * * *